(12) United States Patent
Dai et al.

(10) Patent No.: US 12,089,151 B2
(45) Date of Patent: Sep. 10, 2024

(54) WIRELESS COMMUNICATION METHOD AND APPARATUS

(71) Applicant: HUAWEI TECHNOLOGIES CO., LTD., Guangdong (CN)

(72) Inventors: Mingzeng Dai, Shenzhen (CN); Xiaoli Shi, Shanghai (CN); Hongzhuo Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 525 days.

(21) Appl. No.: 17/362,909

(22) Filed: Jun. 29, 2021

(65) Prior Publication Data

US 2021/0329548 A1 Oct. 21, 2021

Related U.S. Application Data

(63) Continuation of application No. PCT/CN2019/128923, filed on Dec. 27, 2019.

(30) Foreign Application Priority Data

Dec. 29, 2018 (CN) .......................... 201811633343.6

(51) Int. Cl.
*H04W 76/27* (2018.01)
*H04W 52/02* (2009.01)

(52) U.S. Cl.
CPC ....... *H04W 52/0209* (2013.01); *H04W 76/27* (2018.02)

(58) Field of Classification Search
CPC ............. H04W 52/0209; H04W 76/27; H04W 52/0258; Y02D 30/70
See application file for complete search history.

(56) References Cited

U.S. PATENT DOCUMENTS

| 10,582,560 B2* | 3/2020 | Park ...................... H04W 8/005 |
| 11,369,000 B2* | 6/2022 | Geng ................ H04W 12/0431 |
| 2008/0089290 A1 | 4/2008 | Coulas et al. |
| 2015/0003361 A1 | 1/2015 | Palat et al. |

(Continued)

FOREIGN PATENT DOCUMENTS

| CN | 105228229 A | 1/2016 |
| CN | 108616999 A | 10/2018 |

(Continued)

OTHER PUBLICATIONS

Huawei, HiSilicon, Discussion on CN location Update and RNA Update for inactive state. 3GPP TSG-RAN WG2 101-bis, Sanya, China, Apr. 16-20, 2018, R2-1805313, 2 pages.

(Continued)

*Primary Examiner* — Julio R Perez
(74) *Attorney, Agent, or Firm* — HUAWEI TECHNOLOGIES CO., LTD.

(57) ABSTRACT

This application provides a wireless communication method and apparatus. The method includes: determining reference information, where the reference information includes information about first duration and/or information about a first cell, the first duration includes duration in which a terminal device is in an inactive state, and the first cell includes a cell in which the terminal device performs an RNAU; and sending the reference information.

18 Claims, 8 Drawing Sheets

(56) References Cited

U.S. PATENT DOCUMENTS

| | | | |
|---|---|---|---|
| 2015/0173013 A1 | 6/2015 | Iwai et al. | |
| 2015/0282009 A1 | 10/2015 | Iwai et al. | |
| 2020/0029262 A1* | 1/2020 | Kim | H04W 74/0833 |
| 2020/0145878 A1 | 5/2020 | Jin et al. | |
| 2021/0274393 A1* | 9/2021 | Zhou | H04W 76/27 |
| 2021/0314860 A1* | 10/2021 | Chen | H04W 48/18 |
| 2021/0329548 A1* | 10/2021 | Dai | H04W 76/27 |
| 2022/0095331 A1* | 3/2022 | Laselva | H04W 76/27 |
| 2022/0394804 A1* | 12/2022 | Wang | H04W 8/183 |
| 2023/0292229 A1* | 9/2023 | Ding | H04W 48/16 |
| | | | 455/434 |

FOREIGN PATENT DOCUMENTS

| | | | | |
|---|---|---|---|---|
| CN | 108811020 A | | 11/2018 | |
| CN | 108924884 A | | 11/2018 | |
| CN | 116830734 A | * | 9/2023 | H04W 4/40 |
| EP | 2621234 A1 | | 7/2013 | |
| WO | 2014006815 A1 | | 1/2014 | |
| WO | 2018170516 A2 | | 9/2018 | |

OTHER PUBLICATIONS

CATT, Services Type in Inactive Mode. 3GPP TSG-RAN WG2 Meeting #101, Athens, Greece, Feb. 26-Mar. 2, 2018, R2-1801836, 2 pages.

* cited by examiner

WIRELESS COMMUNICATION METHOD AND APPARATUS

CROSS-REFERENCE TO RELATED APPLICATIONS

This application is a continuation of International Application No. PCT/CN2019/128923, filed on Dec. 27, 2019, which claims priority to Chinese Patent Application No. 201811633343.6, filed on Dec. 29, 2018. The disclosures of the aforementioned applications are hereby incorporated by reference in their entireties.

TECHNICAL FIELD

Embodiments of this application relate to the communication field, and more specifically, to a wireless communication method and apparatus, and a communication device.

BACKGROUND

Currently, a communication state (namely, a radio resource control (radio resource control, RRC) inactive state, referred to as an inactive state for short) of a terminal is known. In the inactive state, a core network device, an access device, and a terminal device each retain context information of the terminal device.

In addition, in the conventional technology, a radio access network (RAN) based notification area (RAN based Notification Area, (RNA)) is defined. The RNA includes one cell or a plurality of cells. If the RNA includes a plurality of cells, the plurality of cells belong to a same base station, or may belong to different base stations, where the different base stations may be base stations of a same radio access type (RAT), or may be base stations of different RATs.

In the inactive state, when moving inside the RNA, the terminal device does not feed back a channel quality status to a network side (for example, the access device or the core network device), and needs to notify the network side after moving out of the RNA.

For example, assuming that a camping base station of a terminal device #X in an inactive state is a base station #Y, when the terminal device #X in the inactive state moves, the terminal device #X may perform, in a manner such as cell reselection, downlink synchronization with a new serving base station (a non-camping base station, denoted as a base station #Z), for example, data transmission, an RNA update (RNAU), a tracking area (TA) update, and a registration area update. In other words, the base station #Z may be the camping base station of the terminal device #X. In this case, the base station #Z needs to allocate a new RNA to the terminal device #X.

Therefore, if RNA is improperly allocated, the terminal device may frequently perform RNAUs. Consequently, signaling overheads increase, power consumption of the terminal device increases, and user experience is affected.

In addition, for a terminal in an inactive state, the base station sets an inactive state timer (timer). Specifically, when the terminal device enters the inactive state, the timer is enabled. If the terminal device still has no data to transmit until the timer expires, the base station may further determine a state of the terminal device. For example, the terminal device may be enabled to enter an idle state. Alternatively, the terminal device may be paged, to enter a connected state or the like.

For example, if duration of the timer is set to be excessively short, the UE initiates a communication link to the base station again soon after the base station finds that the timer expires and then controls the terminal device to enter the idle state. This increases signaling overheads.

Therefore, if duration of the timer is improperly set, signaling overheads may increase, power consumption of the terminal device may increase, and user experience is affected.

How to properly configure a related parameter of the inactive state to reduce the signaling overheads and the power consumption of the terminal device becomes an urgent problem to be resolved.

SUMMARY

This application provides a wireless communication method and apparatus, and a communication device, to implement proper configuration of a related parameter of an inactive state, and reduce signaling overheads and power consumption of a terminal device.

According to a first aspect, a wireless communication method is provided, and the method includes: determining reference information, where the reference information includes information about first duration and/or information about a first cell, the first duration includes duration in which a terminal device is in an inactive state, and the first cell includes a cell in which the terminal device performs a radio access network based notification area update RNAU; and sending the reference information.

According to the wireless communication method provided in this application, the terminal device or a source camping access device of the terminal device records the duration in which the terminal device is in the inactive state, and a target camping access device of the terminal device configures an inactive state timer for the terminal device based on the duration, so that a reference and a basis can be provided for setting the timer. Therefore, signaling overheads caused by improper setting of the timer can be avoided. Alternatively, the terminal device or a source camping access device of the terminal device records the cell in which the terminal device is located when the RNAU is performed, and a target camping access device of the terminal device configures an RNA for the terminal device based on the cell, so that a reference and a basis can be provided for setting the RNA. Therefore, signaling overheads caused by improper setting of the RNA can be avoided, power consumption of the terminal device can be further reduced, and user experience can be improved.

The "information about the first duration" may be understood as related information of the first duration, or information used to determine the first duration.

The information about the first duration (or related information) may include indication information that can directly indicate the first duration.

Alternatively, the information about the first duration (or related information) may include indication information that can indirectly indicate the first duration.

For example, the information about the first duration (or related information) may include indication information of a start moment of the first duration and indication information of an end moment of the first duration.

For another example, the information about the first duration (or related information) may include indication information indicating a moment at which the terminal device enters the inactive state and indication information indicating a moment at which the terminal device ends the inactive state.

The method provided in the first aspect may be performed by a first access device, and a receive end of the reference information may be a second access device.

Alternatively, the method provided in the first aspect may be performed by the terminal device, and a receive end of the reference information may be a second access device.

For example, the second access device may be a target access device to which the terminal device needs to be handed over, and the first access device may be a source access device of the terminal device.

For another example, the first access device may be a primary base station, and the second access device may be a secondary base station.

For another example, the first access device may be an original camping base station of the terminal device, and the second access device may be a new camping base station of the terminal device.

It should be noted that the terminal device may be in the inactive state for a plurality of times. In this case, there may be a plurality of pieces of first duration.

In addition, the plurality of times of the inactive state are in a one-to-one correspondence with the plurality of pieces of first duration. In other words, one piece of first duration may include duration that corresponds to one time of the inactive state.

In addition, there may be one or more cells in which the terminal device performs the radio access network based notification area update RNAU.

In addition, the first cell may include some or all of the one or more cells.

Optionally, the reference information further includes information about a second cell corresponding to the first duration, and the second cell includes a cell in which the terminal device in the inactive state corresponding to the first duration is located.

Therefore, the target camping access device of the terminal device can configure, based on related information of the cell corresponding to the first duration, an inactive state timer for the terminal device, so that the specified timer can further match an actual communication state of the terminal device, thereby further improving practicability of this application.

Optionally, the reference information further includes information about an inactive state type corresponding to the first duration, and the inactive state type includes a session inactive state type, a data radio bearer inactive state type, or a terminal device inactive state type.

The "inactive state type corresponding to the first duration" may be understood as follows: If the first duration corresponds to a first inactive state type, the first duration may include duration in which the terminal device is in the inactive state in the first inactive state type.

Optionally, the reference information further includes information about an RNAU type corresponding to the first cell, and the RNAU type includes a periodically triggered RNAU type or a terminal device movement triggered RNAU type.

The "RNAU type corresponding to the first cell" may be understood as a type of an RNAU performed in the first cell.

Optionally, the method further includes: recording the reference information in history information of the terminal device.

Therefore, the reference information can be carried based on existing signaling or information, and signaling overheads can be further reduced.

Optionally, the method further includes: receiving request information; and the sending the reference information includes: sending the reference information based on the request information.

Optionally, the request information includes type indication information, the type indication information is used to indicate a first inactive state type, and the first inactive state type includes the session inactive state type, the data radio bearer inactive state type, or the terminal device inactive state type; and the determining reference information includes: determining the information about the first duration based on the type indication information.

The inactive state type that corresponds to the first duration and that is determined based on the type indication information is the first inactive state type.

Therefore, the target camping access device of the terminal device can configure, based on the inactive state type corresponding to the first duration, an inactive state timer corresponding to the inactive state type for the terminal device, so that the specified timer can further match an actual communication state of the terminal device, thereby further improving practicability of this application.

Optionally, when the method is performed by the first access device, the method further includes: receiving first indication information sent by a third access device, where the first indication information is used to indicate the first duration; or receiving second indication information sent by a third access device, where the second indication information is used to indicate a moment at which the terminal device enters the inactive state and a moment at which the terminal device ends the inactive state. The first access device includes a centralized unit CU, and the third access device includes a distributed unit DU; or the first access device includes a centralized unit control plane CU-CP entity, and the third access device includes a centralized unit user plane CU-UP entity, where at least one protocol layer of a packet data convergence protocol PDCP layer and a radio resource control RRC layer is configured in the CU; and at least one protocol layer of a radio link control RLC layer, a media access control MAC layer, and a physical PHY layer is configured in the DU.

It should be noted that "the second indication information is used to indicate a moment at which the terminal device enters the inactive state and a moment at which the terminal device ends the inactive state" may be understood as that there is one piece of second indication information, and information about the moment at which the terminal device enters the inactive state and information about the moment at which the terminal device ends the inactive state are carried in the same piece of second indication information. In other words, the information about the moment at which the terminal device enters the inactive state and the information about the moment at which the terminal device ends the inactive state may be synchronously sent.

That "the second indication information is used to indicate a moment at which the terminal device enters the inactive state and a moment at which the terminal device ends the inactive state" may be understood as that there are two pieces of second indication information, and information about the moment at which the terminal device enters the inactive state and information about the moment at which the terminal device ends the inactive state are separately carried in the different second indication information. In other words, the information about the moment at which the terminal device enters the inactive state and the information about the moment at which the terminal device ends the inactive state may be asynchronously sent.

Optionally, when the method is performed by the first access device, and the reference information includes the information about the first duration, the sending the reference information includes: sending the reference information to a second access device. The first access device includes a DU, and the second access device includes a CU; or the first access device includes a CU-UP entity, and the second access device includes a CU-CP entity, where at least one protocol layer of a PDCP layer and an RRC layer is configured in the CU; and at least one protocol layer of an RLC layer, a MAC layer, and a PHY layer is configured in the DU.

Optionally, the method further includes: adjusting duration of an inactive state timer of the terminal device based on the first duration.

Optionally, the method further includes: configuring a radio access network based notification area RNA for the terminal device based on the first cell.

According to a second aspect, a wireless communication method is provided, including: receiving reference information, where the reference information includes information about first duration and/or information about a first cell, the first duration includes duration in which a terminal device is in an inactive state, and the first cell includes a cell in which the terminal device performs a radio access network based notification area update RNAU; and adjusting duration of an inactive state timer of the terminal device based on the first duration; or configuring a radio access network based notification area RNA for the terminal device based on the first cell.

According to the wireless communication method provided in this application, the terminal device or a camping access device of the terminal device records the duration in which the terminal device is in the inactive state, so that the access device configures the inactive state timer for the terminal device based on the duration, and a reference and a basis can be provided for setting the timer. Therefore, signaling overheads caused by improper setting of the timer can be avoided. Alternatively, the terminal device or a camping access device of the terminal device records the cell in which the terminal device is located when the RNAU is performed, so that the access device configures the RNA for the terminal device based on the cell, and a reference and a basis can be provided for setting the RNA. Therefore, signaling overheads caused by improper setting of the RNA can be avoided, power consumption of the terminal device can be further reduced, and user experience can be improved.

The "adjusting duration of an inactive state timer corresponding to the terminal device based on the first duration" may be understood as adjusting duration of a dedicated timer corresponding to the terminal device based on the first duration.

Alternatively, the "adjusting duration of an inactive state timer corresponding to the terminal device based on the first duration" may be understood as adjusting, based on the first duration, duration of a common timer corresponding to all terminal devices in a cell in which the terminal device is located.

Alternatively, the "adjusting duration of an inactive state timer corresponding to the terminal device based on the first duration" may be understood as adjusting, based on the first duration, duration of a common timer corresponding to all terminal devices within coverage of a serving access device of the terminal device.

Alternatively, the "adjusting duration of an inactive state timer corresponding to the terminal device based on the first duration" may be understood as adjusting, based on the first duration, duration of a common timer corresponding to all terminal devices in a first terminal device group that includes the terminal device.

In addition, the "configuring a radio access network based notification area RNA for the terminal device based on the first cell" may be understood as configuring a dedicated RNA for the terminal device based on the first cell. In addition, in this case, the RNA may be sent to the terminal device by using dedicated signaling of the terminal device.

Alternatively, the "configuring a radio access network based notification area RNA for the terminal device based on the first cell" may be understood as configuring, based on the first cell, a common RNA for a cell (or for all terminal devices in the cell) in which the terminal device is located. In addition, in this case, the RNA may be sent by using system information of the cell.

Alternatively, the "configuring a radio access network based notification area RNA for the terminal device based on the first cell" may be understood as configuring, based on the first cell, a common RNA for a serving access device of the terminal device (or for all terminal devices within coverage of the serving access device).

Alternatively, the "configuring a radio access network based notification area RNA for the terminal device based on the first cell" may be understood as configuring, based on the first cell, a common RNA for a first terminal device group that includes the terminal device.

The "information about the first duration" may be understood as related information of the first duration, or information used to determine the first duration.

The information about the first duration (or related information) may include indication information that can directly indicate the first duration.

Alternatively, the information about the first duration (or related information) may include indication information that can indirectly indicate the first duration.

For example, the information about the first duration (or related information) may include indication information of a start moment of the first duration and indication information of an end moment of the first duration.

For another example, the information about the first duration (or related information) may include indication information indicating a moment at which the terminal device enters the inactive state and indication information indicating a moment at which the terminal device ends the inactive state.

The method provided in the second aspect may be performed by a second access device, and a transmit end of the reference information may be a first access device.

Alternatively, the method provided in the second aspect may be performed by a second access device, and a transmit end of the reference information may be the terminal device.

For example, the second access device may be a target access device to which the terminal device needs to be handed over, and the first access device may be a source access device of the terminal device.

For another example, the first access device may be a primary base station, and the second access device may be a secondary base station.

For another example, the first access device may be an original camping base station of the terminal device, and the second access device may be a new camping base station of the terminal device.

It should be noted that the terminal device may be in the inactive state for a plurality of times. In this case, there may be a plurality of pieces of first duration.

In addition, the plurality of times of the inactive state are in a one-to-one correspondence with the plurality of pieces of first duration. In other words, one piece of first duration may include duration that corresponds to one time of the inactive state.

In addition, there may be one or more cells in which the terminal device performs the radio access network based notification area update RNAU.

In addition, the first cell may include some or all of the one or more cells.

Optionally, the reference information further includes information about a second cell corresponding to the first duration, and the second cell includes a cell in which the terminal device in the inactive state corresponding to the first duration is located.

For example, the adjusting duration of an inactive state timer of the terminal device based on the first duration includes: adjusting duration of the inactive state timer of the terminal device in a third cell based on the first duration, where the third cell corresponds to the second cell.

For example, "the third cell corresponds to the second cell" may be understood as that the third cell and the second cell are a same cell.

For example, "the third cell corresponds to the second cell" may be understood as that a similarity between preset parameters of the third cell and the second cell is greater than or equal to a preset similarity.

Optionally, the reference information further includes information about an inactive state type corresponding to the first duration, and the inactive state type includes a session inactive state type, a data radio bearer inactive state type, or a terminal device inactive state type.

In this case, the adjusting duration of an inactive state timer of the terminal device based on the first duration includes: adjusting, based on the first duration, the duration of the inactive state timer that is of the terminal device and that is in the inactive state type corresponding to the first duration.

Optionally, the reference information further includes information about an RNAU type corresponding to the first cell, and the RNAU type includes a periodically triggered RNAU type or a terminal device movement triggered RNAU type.

The "RNAU type corresponding to the first cell" may be understood as a type of an RNAU performed in the first cell.

Optionally, the reference information is carried in history information of the terminal device.

Optionally, the method further includes: sending request information, where the request information is used to request the reference information.

Optionally, the request information includes type indication information, the type indication information is used to indicate a first inactive state type, and the first inactive state type includes the session inactive state type, the data radio bearer inactive state type, or the terminal device inactive state type.

Optionally, the method is performed by the second access device, and the receiving reference information includes: receiving the information about the first duration sent by the first access device. The first access device includes a distributed unit DU, and the second access device includes a centralized unit CU; or the first access device includes a centralized unit user plane CU-UP entity, and the second access device includes a centralized unit control plane CU-CP entity, where at least one layer of a PDCP layer and an RRC layer is configured in the CU; and at least one layer of an RLC layer, a MAC layer, and a PHY layer is configured in the DU.

According to a third aspect, a wireless communication apparatus is provided, and the apparatus includes: a processing unit, configured to determine reference information, where the reference information includes information about first duration and/or information about a first cell, the first duration includes duration in which a terminal device is in an inactive state, and the first cell includes a cell in which the terminal device performs a radio access network based notification area update RNAU; and a transceiver unit, configured to send the reference information.

The apparatus may be configured on a first access device or may be a first access device, and a receive end of the reference information may be a second access device.

Alternatively, the apparatus may be configured on the terminal device or may be the terminal device, and a receive end of the reference information may be a second access device.

For example, the second access device may be a target access device to which the terminal device needs to be handed over, and the first access device may be a source access device of the terminal device.

For another example, the first access device may be a primary base station, and the second access device may be a secondary base station.

For another example, the first access device may be an original camping base station of the terminal device, and the second access device may be a new camping base station of the terminal device.

Optionally, the reference information further includes information about a second cell corresponding to the first duration, and the second cell includes a cell in which the terminal device in the inactive state corresponding to the first duration is located.

Optionally, the reference information further includes information about an inactive state type corresponding to the first duration, and the inactive state type includes a session inactive state type, a data radio bearer inactive state type, or a terminal device inactive state type.

Optionally, the reference information further includes information about an RNAU type corresponding to the first cell, and the RNAU type includes a periodically triggered RNAU type or a terminal device movement triggered RNAU type.

Therefore, a target camping access device of the terminal device can configure the RNA for the terminal device based on related information of the RNAU type, so that the specified RNA can further match an actual communication state of the terminal device, thereby further improving practicability of this application.

Optionally, the processing unit is further configured to record the reference information in history information of the terminal device.

Optionally, the transceiver unit is further configured to: receive request information, and send the reference information based on the request information.

Optionally, the request information includes type indication information, the type indication information is used to indicate a first inactive state type, and the first inactive state type includes the session inactive state type, the data radio bearer inactive state type, or the terminal device inactive state type.

Optionally, the processing unit is configured to determine the information about the first duration based on the type indication information, so that the inactive state type corresponding to the first duration is the first inactive state type.

Optionally, when the apparatus is configured on the first access device or is the first access device, the transceiver unit is further configured to receive first indication information sent by a third access device, where the first indication information is used to indicate the first duration; or the transceiver unit is further configured to receive second indication information sent by a third access device, where the second indication information is used to indicate a moment at which the terminal device enters the inactive state and a moment at which the terminal device ends the inactive state. The first access device includes a centralized unit CU, and the third access device includes a distributed unit DU; or the first access device includes a centralized unit control plane CU-CP entity, and the third access device includes a centralized unit user plane CU-UP entity, where a packet data convergence protocol PDCP layer and a radio resource control RRC layer are configured in the CU; and a radio link control RLC layer, a media access control MAC layer, and a physical PHY layer are configured in the DU.

Optionally, when the apparatus is configured on the first access device or is the first access device, and the reference information includes the information about the first duration, the transceiver unit is specifically configured to send the reference information to a second access device. The first access device includes a DU, and the second access device includes a CU; or the first access device includes a CU-UP entity, and the second access device includes a CU-CP entity, where a PDCP layer and an RRC layer are configured in the CU; and an RLC layer, a MAC layer, and a PHY layer are configured in the DU.

The units in the apparatus are respectively configured to perform the steps of the communication method in the first aspect and the implementations of the first aspect.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to a fourth aspect, a wireless communication apparatus is provided, and the apparatus includes: a transceiver unit, configured to receive reference information, where the reference information includes information about first duration and/or information about a first cell, the first duration includes duration in which a terminal device is in an inactive state, and the first cell includes a cell in which the terminal device performs a radio access network based notification area update RNAU; and a processing unit, configured to adjust duration of an inactive state timer of the terminal device based on the first duration; or configured to configure a radio access network based notification area RNA for the terminal device based on the first cell.

The apparatus may be configured to be executed by a second access device or may be a second access device, and a receive end of the reference information may be a first access device.

Alternatively, the apparatus may be configured to be executed by a second access device or may be a second access device, and a receive end of the reference information may be the terminal device.

For example, the second access device may be a target access device to which the terminal device needs to be handed over, and the first access device may be a source access device of the terminal device.

For another example, the first access device may be a primary base station, and the second access device may be a secondary base station.

For another example, the first access device may be an original camping base station of the terminal device, and the second access device may be a new camping base station of the terminal device.

Optionally, the reference information further includes information about a second cell corresponding to the first duration, and the second cell includes a cell in which the terminal device in the inactive state corresponding to the first duration is located.

Optionally, the reference information further includes information about an inactive state type corresponding to the first duration, and the inactive state type includes a session inactive state type, a data radio bearer inactive state type, or a terminal device inactive state type; and the adjusting duration of an inactive state timer of the terminal device based on the first duration includes:

adjusting, based on the first duration, the duration of the inactive state timer that is of the terminal device and that is in the inactive state type corresponding to the first duration.

Optionally, the reference information further includes information about an RNAU type corresponding to the first cell, and the RNAU type includes a periodically triggered RNAU type or a terminal device movement triggered RNAU type.

Optionally, the reference information is carried in history information of the terminal device.

Optionally, the transceiver unit is further configured to send request information, where the request information is used to request the reference information.

Optionally, the request information includes type indication information, the type indication information is used to indicate a first inactive state type, and the first inactive state type includes the session inactive state type, the data radio bearer inactive state type, or the terminal device inactive state type.

Optionally, the apparatus may be configured to be executed by the second access device or may be the second access device, and the transceiver unit is configured to receive the information about the first duration sent by the first access device. The first access device includes a distributed unit DU, and the second access device includes a centralized unit CU; or the first access device includes a centralized unit user plane CU-UP entity, and the second access device includes a centralized unit control plane CU-CP entity, where at least one protocol layer of a PDCP layer and an RRC layer is configured in the CU; and at least one protocol layer of an RLC layer, a MAC layer, and a PHY layer is configured in the DU.

The units in the apparatus are respectively configured to perform the steps of the communication method in the second aspect and the implementations of the second aspect.

In a design, the communication apparatus is a communication chip. The communication chip may include an input circuit or interface configured to send information or data, and an output circuit or interface configured to receive information or data.

In another design, the communication apparatus is a communication device. The communication device may include a transmitter configured to send information or data, and a receiver configured to receive information or data.

According to a fifth aspect, a communication device is provided, including a processor and a memory. The memory is configured to store a computer program. The processor is configured to invoke the computer program from the memory and run the computer program, so that the communication device is enabled to perform the communication method in the first aspect and various implementations of the first aspect.

Optionally, there are one or more processors and one or more memories.

Optionally, the memory and the processor may be integrated together, or the memory and the processor may be separately disposed.

Optionally, the communication device further includes a transmitting machine (transmitter) and a receiving machine (receiver).

According to a sixth aspect, a communication device is provided, including a processor and a memory. The memory is configured to store a computer program. The processor is configured to invoke the computer program from the memory and run the computer program, so that the communication device is enabled to perform the communication method in the second aspect and various implementations of the second aspect.

Optionally, there are one or more processors and one or more memories.

Optionally, the memory and the processor may be integrated together, or the memory and the processor may be separately disposed.

Optionally, the communication device further includes a transmitting machine (transmitter) and a receiving machine (receiver).

According to a seventh aspect, a communication system is provided, including the communication device provided in the fifth aspect and/or the communication device provided in the sixth aspect.

In a possible design, the communication system may further include another device interacting with the communication device in the solutions provided in the embodiments of this application.

According to an eighth aspect, a computer program product is provided. The computer program product includes a computer program (which may also be referred to as code or instructions). When the computer program is run, a computer is enabled to perform the method according to any one of the possible implementations of the first aspect or any one of the possible implementations of the second aspect.

According to a ninth aspect, a computer-readable medium is provided. The computer-readable medium stores a computer program (which may also be referred to as code or instructions). When the computer program is run on a computer, the computer is enabled to perform the method according to any one of the possible implementations of the first aspect or any one of the possible implementations of the second aspect.

According to a tenth aspect, a chip system is provided. The chip system includes a memory and a processor. The memory is configured to store a computer program. The processor is configured to invoke the computer program from the memory and run the computer program, to enable a communication device on which the chip system is installed to perform the method according to any one of the possible implementations of the first aspect or any one of the possible implementations of the second aspect.

The chip system may include an input circuit or interface configured to send information or data, and an output circuit or interface configured to receive information or data.

According to the wireless communication method provided in this application, the terminal device or the source camping access device of the terminal device records the duration in which the terminal device is in the inactive state, and the target camping access device of the terminal device configures the inactive state timer for the terminal device based on the duration, so that the reference and the basis can be provided for setting the timer. Therefore, the signaling overheads caused by improper setting of the timer can be avoided. Alternatively, the terminal device or the source camping access device of the terminal device records the cell in which the terminal device is located when the RNAU is performed, and the target camping access device of the terminal device configures the RNA for the terminal device based on the cell, so that the reference and the basis can be provided for setting the RNA. Therefore, the signaling overheads caused by improper setting of the RNA can be avoided, the power consumption of the terminal device can be further reduced, and user experience can be improved.

DESCRIPTION OF EMBODIMENTS

Figure 1:
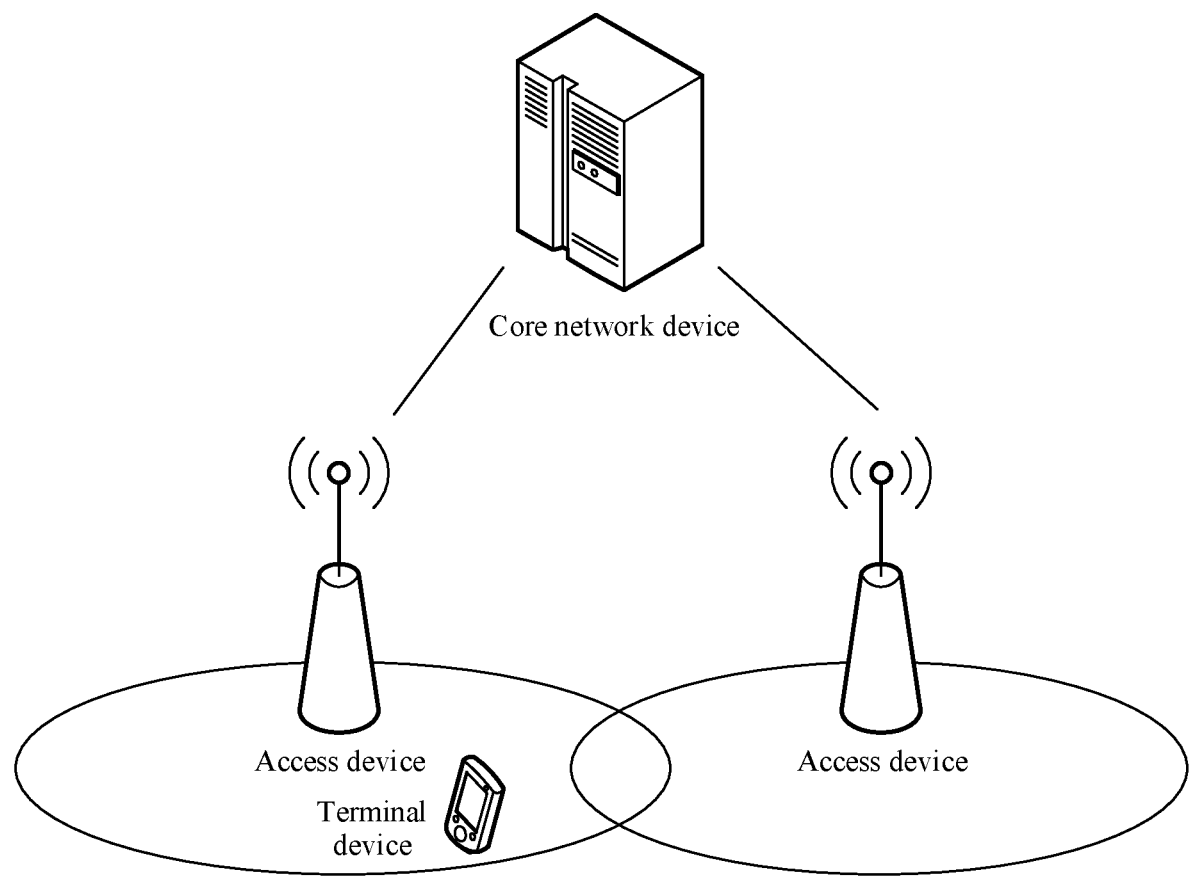
FIG. 1 is a schematic structural diagram of an example of a communication system according to this application.

The following describes the technical solutions in this application with reference to the accompanying drawings.

The technical solutions in the embodiments of this application may be used in various communication systems, for example, a long term evolution (LTE) system, an LTE frequency division duplex (FDD) system, an LTE time division duplex (TDD) system, a universal mobile telecommunications system (UMTS) system, a 5th generation (5G) system, or a new radio (NR) system.

A terminal device in the embodiments of this application may also be referred to as user equipment (UE), a mobile station (MS), a mobile terminal (MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

The terminal device may be a device that provides a user with voice/data connectivity, for example, a handheld device or a vehicle-mounted device having a wireless connection function. Currently, examples of some terminals are: a mobile phone, a tablet computer, a laptop computer, a palmtop computer, a mobile internet device (MID), a wearable device, a virtual reality (VR) device, an augmented reality (AR) device, a wireless terminal in industrial control (industrial control), a wireless terminal in self driving, a wireless terminal in remote medical surgery (remote medical surgery), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), and the like. This is not limited in the embodiments of this application.

As an example, the embodiments of this application may be embodied as a terminal device or may alternatively be a wearable device. The wearable device may also be referred to as a wearable intelligent device, and is a general term for wearable device such as glasses, gloves, watches, clothes, and shoes that are developed by applying wearable technologies to intelligent designs of daily wear. The wearable device is a portable device that can be directly worn by a user or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In addition, the terminal device in the embodiments of this application may alternatively be a terminal device in an internet of things (IoT) system. The IoT is an important part of future development of information technologies. A main technical feature of the IoT is to connect a thing to a network by using a communication technology, to implement an intelligent network for interconnection between a person and a machine or between one thing and another.

In the embodiments of this application, an IoT technology may implement massive connections, deep coverage, and terminal power saving by using, for example, a narrowband (narrow band) NB technology. For example, the NB includes only one resource block (RB). In other words, a bandwidth of the NB is only 180 KB. To implement massive access, terminals are required to be discrete in access. According to a communication method in the embodiments of this application, a congestion problem that occurs when massive terminals access a network through the NB in the IoT technology can be effectively resolved.

In addition, an access device in the embodiments of this application may be a device configured to communicate with the terminal device. The access device may also be referred to as an access network device or a radio access network device, and may be a base transceiver station (BTS) in a global system for mobile communications (GSM) system or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. Alternatively, the access device may be a relay station, an access point, a vehicle-mounted device, a wearable device, an access device in a future 5G network, an access device in a future evolved PLMN network, or the like, or may be an access point (AP) in a WLAN, or may be a gNB in a new radio (NR) system. This is not limited in the embodiments of this application.

In addition, in the embodiments of this application, the access device is a device in a RAN, in other words, the terminal device accesses a RAN node in a wireless network. For example, as an example instead of a limitation, the access device may be illustrated: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wifi) access point (AP). In a network structure, a network device may include a centralized unit (CU) node, a distributed unit (DU) node, a RAN device including a CU node and a DU node, or a RAN device including a control plane CU node (CU-CP node), a user plane CU node (CU-UP node), and a DU node.

The access device serves a cell. The terminal device communicates with the access device on a transmission resource (for example, a frequency domain resource, or a spectrum resource) used for the cell. The cell may be a cell corresponding to the access device (for example, a base station). The cell may belong to a macro base station, or a base station corresponding to a small cell (small cell). The small cell herein may include a metro cell, a micro cell, a pico cell (pico cell), a femto cell, or the like. These small cells have features of small coverage and low transmit power, and are suitable for providing a high-rate data transmission service.

In addition, a plurality of cells may simultaneously work in a same frequency band on a carrier in the LTE system or the 5G system. In some special scenarios, the concept of the carrier is considered equivalent to that of the cell. For example, in a carrier aggregation (CA) scenario, both a carrier index of a secondary component carrier and a cell identity (cell indentification, Cell ID) of a secondary cell that works on the secondary component carrier are carried when the secondary component carrier is configured for UE. In this case, the concept of the carrier is considered equivalent to that of the cell. For example, that the terminal device accesses a carrier is equivalent to that the terminal device accesses a cell.

FIG. 1 is a schematic diagram of a network architecture according to an embodiment of this application. As shown in FIG. 1, a terminal device may have communication connections to two access devices at the same time and may receive and send data. This may be referred to as dual-connectivity (DC). One of the two access devices may be responsible for exchanging a radio resource control message with the terminal device, and is responsible for interacting with a core network control plane entity. In this case, the access device may be referred to as a primary base station (master node, MN), and the other radio access network device may be referred to as a secondary base station (secondary node, SN).

Similarly, the terminal device may also have communication connections to a plurality of access devices at the same time and may receive and send data. This may be referred to as multi-connectivity (MC). In the plurality of access devices, one access device may be responsible for exchanging a radio resource control message with the terminal device, and is responsible for interacting with a core network control plane entity. In this case, the access device may be referred to as an MN, and the remaining access devices may be referred to as SNs.

In this application, the access device may be an eNB in an LTE standard, a gNB in an NR standard, a primary base station (master node, MN) in a dual-connectivity architecture, a secondary base station in a dual-connectivity architecture, an MN in a multi-connectivity architecture, or an SN in a multi-connectivity architecture.

Figure 2:
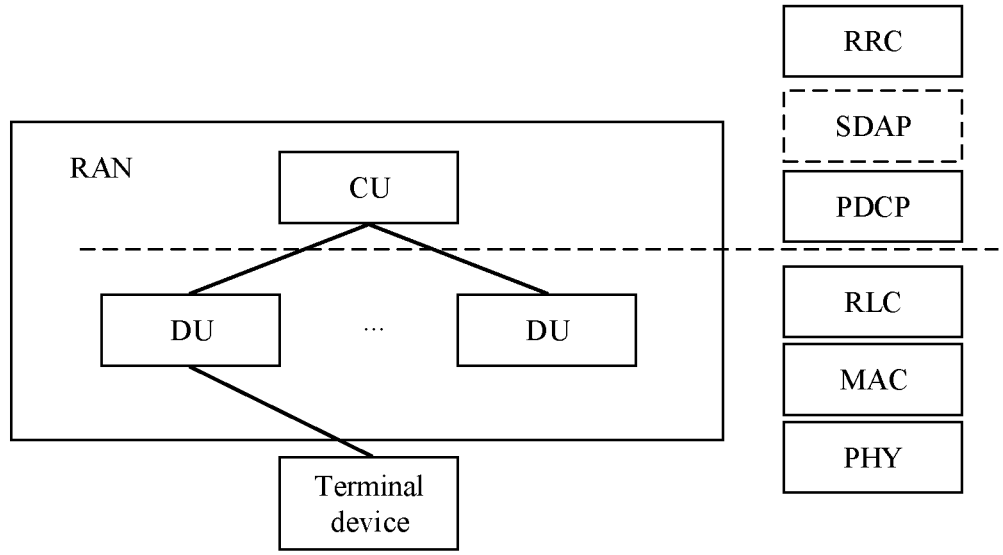
FIG. 2 is a schematic structural diagram of an example of an access device according to this application.

FIG. 2 is a schematic diagram of a network architecture according to an embodiment of this application. As shown in the embodiment of FIG. 2, an access device may include a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communication system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU.

Communication between a RAN device and a terminal device complies with a specified protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In an implementation, a service data adaptation protocol (SDAP) layer is further included above the PDCP layer.

The functions of these protocol layers may be implemented by one node, or may be implemented by a plurality of nodes. For example, in an evolved structure, a RAN device may include a centralized unit (CU) and a distributed unit (DU), and a plurality of DUs may be centrally controlled by one CU.

As shown in FIG. 2, the CU and the DU may be divided based on a protocol layer of a wireless network. For example, functions of the PDCP layer and a protocol layer above the PDCP layer are set on the CU, and functions of protocol layers below the PDCP layer, such as the RLC layer and the MAC layer, are set on the DU. In other words, the CU has functions of layers (including the PDCP layer, the RRC layer, and the SDAP layer) above the PDCP layer, and the DU has functions of layers (including the RLC layer, the MAC layer, and the PHY layer) below the PDCP layer.

Division into the protocol layers is merely an example, and division may alternatively be performed at another protocol layer, for example, the RLC layer. Functions of the RLC layer and a protocol layer above the RLC layer are set on the CU, and a function of a protocol layer below the RLC layer are set on the DU. Alternatively, division is performed in a protocol layer, for example, a part of a function of the RLC layer and a function of a protocol layer above the RLC layer are set on the CU, and a remaining function of the RLC layer and a function of a protocol layer below the RLC layer are set on the DU. In addition, division may alternatively be performed in another manner. For example, the division is performed based on a latency. A function whose processing time needs to satisfy a latency requirement is set on the DU, and a function whose processing time does not need to satisfy the latency requirement is set on the CU.

In addition, the radio frequency apparatus may be not placed in the DU but is placed remotely from the DU, or may be integrated into the DU, or a part is placed remotely from the DU and a remaining part is integrated into the DU. This is not limited herein.

Figure 3:
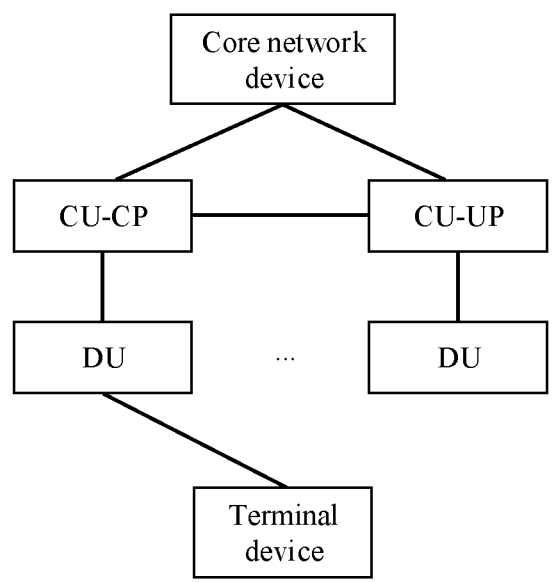
FIG. 3 is a schematic structural diagram of another example of an access device according to this application.

FIG. 3 is another schematic diagram of a network architecture to which an embodiment of this application is applicable. Compared with the architecture shown in FIG. 2, a control plane (CP) and a user plane (UP) of a CU may be further separated into different entities for implementation, and the different entities are a control plane CU entity (CU-CP entity) and a user plane CU entity (CU-UP entity).

In the foregoing network architecture, signaling generated by the CU may be sent to a terminal device by using a DU, or signaling generated by a terminal device may be sent to the CU by using a DU. The DU may transparently transmit the signaling to the terminal device or the CU by directly encapsulating the signaling at a protocol layer without parsing the signaling. In the following embodiments, if transmission of such signaling between the DU and the terminal device is involved, that the DU sends or receives the signaling includes this scenario. For example, signaling at an RRC layer or a PDCP layer is finally processed as signaling at a PHY layer and sent to the terminal device, or is converted from received signaling at a PHY layer. In the architecture, the signaling at the RRC layer or the PDCP layer may further be considered to be sent by the DU, or sent by the DU and a radio frequency apparatus.

In the foregoing embodiments, the CU is classified as a network device on a RAN side. In addition, the CU may alternatively be classified as a network device on a CN side. This is not limited herein.

The apparatus in the following embodiments of this application may be located in a terminal device or a network device based on a function implemented by the apparatus. When the foregoing CU-DU structure is used, the network device may be a CU node, a DU node, or a RAN device including a CU node and a DU node.

Figure 4:
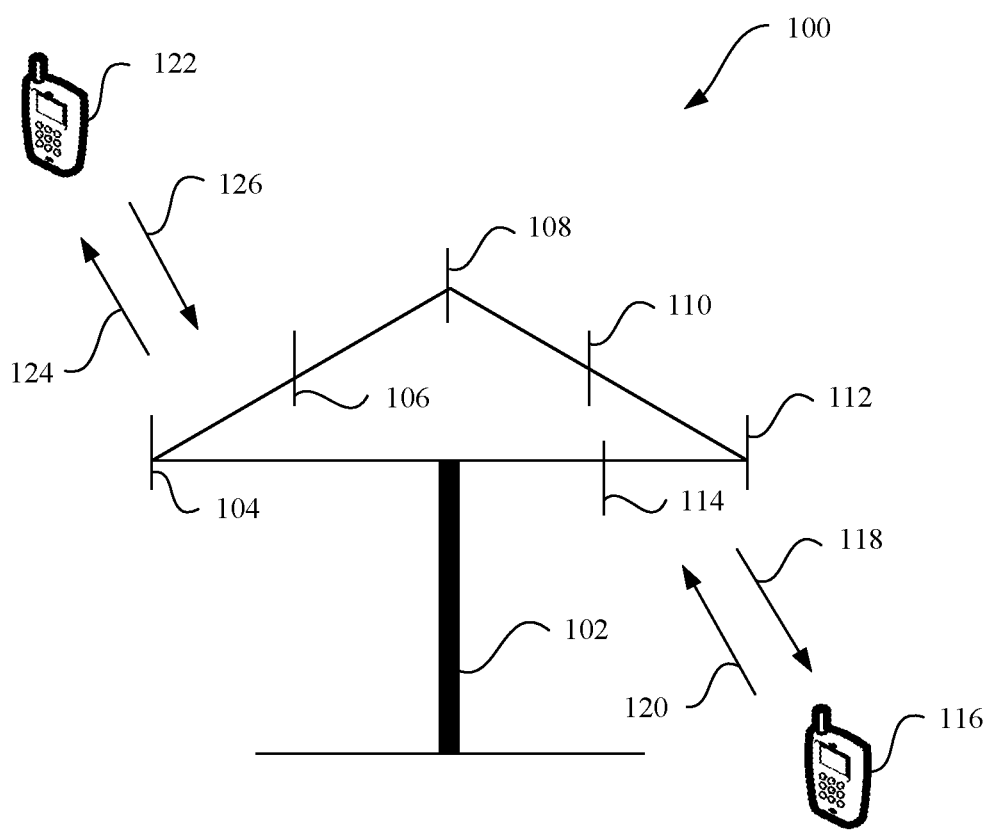
FIG. 4 is a schematic structural diagram of another example of a communication system according to this application.

FIG. 4 is a schematic diagram of a system 100 to which a communication method according to an embodiment of this application is applicable. As shown in FIG. 4, the system 100 includes an access device 102. The access device 102 may include one or more antennas, for example, antennas 104, 106, 108, 110, 112, and 114. In addition, the access device 102 may additionally include a transmitter chain and a receiver chain. A person of ordinary skill in the art can understand that the transmitter chain and the receiver chain may include a plurality of components (for example, a processor, a modulator, a multiplexer, a demodulator, a demultiplexer, or an antenna) related to signal sending and receiving.

The access device 102 may communicate with a plurality of terminal devices (for example, a terminal device 116 and a terminal device 122). However, it may be understood that the access device 102 may communicate with any quantity of terminal devices that are similar to the terminal device 116 or the terminal device 122. The terminal devices 116 and 122 may each be, for example, a cellular phone, a smartphone, a portable computer, a handheld communication device, a handheld computing device, a satellite radio apparatus, a global positioning system, a PDA, and/or any other suitable device configured to perform communication in the wireless communication system 100.

As shown in FIG. 4, the terminal device 116 communicates with the antennas 112 and 114. The antennas 112 and 114 send information to the terminal device 116 over a forward link (also referred to as a downlink) 118, and receive information from the terminal device 116 over a reverse link (also referred to as an uplink) 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (tTDD) system and a full duplex system, the forward link 118 and the reverse link 120 may use a same frequency band, and the forward link 124 and the reverse link 126 may use a same frequency band.

Each antenna (or antenna group including a plurality of antennas) and/or area designed for communication are/is referred to as a sector of the access device 102. For example, an antenna group may be designed to communicate with a terminal device in a sector within coverage of the access device 102. The access device may send, through a single antenna or a multi-antenna transmit diversity, signals to all terminal devices in a corresponding sector. In a process in which the access device 102 communicates with the terminal devices 116 and 122 respectively over the forward links 118 and 124, a transmit antenna of the access device 102 may improve signal-to-noise ratios of the forward links 118 and 124 through beamforming. In addition, compared with a manner in which an access device sends, through a single antenna or a multi-antenna transmit diversity, signals to all terminal devices served by the access device, less interference is caused to a mobile device in a neighboring cell when the access device 102 sends signals through beamforming to the terminal devices 116 and 122 that are randomly scattered in the related coverage.

In a given time, the access device 102, the terminal device 116, or the terminal device 122 may be a wireless communication sending apparatus and/or a wireless communication receiving apparatus. When sending data, the wireless communication sending apparatus may encode data for transmission. Specifically, the wireless communication sending apparatus may obtain (for example, generate, receive from another communication apparatus, or store in a memory) a specific quantity of data bits to be sent on a channel to the wireless communication receiving apparatus. The data bits may be included in a transport block (or a plurality of transport blocks) of the data, and the transport block may be segmented to generate a plurality of code blocks.

In addition, the communication system 100 may be a PLMN network, a D2D network, an M2M network, an IoT network, or another network. FIG. 4 is merely a simplified schematic diagram used as an example. The network may further include another access device, which is not shown in FIG. 4.

It should be understood that FIG. 1 to FIG. 4 are merely examples for description, and should not constitute any limitation on this application. For example, the communication system may further include a core network device. The core network device may be connected to a plurality of access network devices, and is configured to control the access network devices. In addition, data received from a network side (for example, the internet) may be distributed to the access network devices.

In the embodiments of this application, the terminal device or the access device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more of computer operating systems implementing service processing through a process, for example, a Linux operating system, a Unix operating system, an Android operating system, an iOS operating system, and a windows operating system. The application layer includes applications such as a browser, an address book, word processing software, and instant communication software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The "machine-readable media" may include but is not limited to a radio channel, and various other media that can store, include, and/or carry instructions and/or data.

The following describes an inactive state according to some of the embodiments of this application. As an example instead of a limitation, in this application, the inactive state may include one or more of the following types:

Type 1: Session Inactive State Type

The session inactive state type may be understood as an inactive state type at a session granularity. For example, assuming that a terminal device currently has M sessions, when at least one session (denoted as a session #m) in the M sessions meets a condition (denoted as a condition 1) for triggering to enter a session inactive state, it may be determined that the terminal device enters the session inactive state.

After the terminal device enters the session inactive state, a core network device, an access device, and the terminal device may retain a context of the session #m.

As an example instead of a limitation, the condition 1 may include but is not limited to the following conditions:

If duration in which no data is transmitted in the session #m exceeds preset duration #m, it is determined that the terminal device enters the session inactive state. The duration #m may be specified in a communication system or a communication protocol, or the duration #m may be configured by the access device or the core network device, or the duration #m may be configured by an administrator or an operator. This is not particularly limited in this application.

It should be understood that the foregoing enumerated condition 1 is merely an example of the condition for entering the session inactive state, and this application is not limited thereto. All other conditions that can be used to determine whether the terminal enters the session inactive state fall within the protection scope of this application.

In addition, as an example instead of a limitation, the "session" may include but is not limited to a protocol data unit (PDU) session.

Type 2: Bearer Inactive State Type

Specifically, the bearer inactive state type may be understood as an inactive state type at a bearer granularity.

To be specific, assuming that a terminal device currently has N bearers, when at least one bearer (denoted as a bearer #n) in the N bearers meets a condition (denoted as a condition 2) for triggering to enter a bearer inactive state, it may be determined that the terminal device enters the bearer inactive state.

After the terminal device enters the bearer inactive state, a core network device, an access device, and the terminal device may retain a context of the bearer #n.

As an example instead of a limitation, the condition 2 may include but is not limited to the following conditions:

If duration in which no data is transmitted on the bearer #n exceeds preset duration #n, it is determined that the terminal device enters the bearer inactive state. The duration #n may be specified in a communication system or a communication protocol, or the duration #n may be configured by the access device or the core network device, or the duration #n may be configured by an administrator or an operator. This is not particularly limited in this application.

It should be understood that the foregoing enumerated condition 2 is merely an example of the condition for entering the bearer inactive state, and this application is not limited thereto. All other conditions that can be used to determine whether the terminal enters the bearer inactive state fall within the protection scope of this application.

In addition, as an example instead of a limitation, the "bearer" may include but is not limited to a data radio bearer (data radio bearer, DRB).

Type 3: Terminal Inactive State Type

Specifically, the terminal inactive state type may be understood as an inactive state type at a terminal granularity.

That is, there is only a connection management (CM) connected state between a terminal and a network side, and the CM connected state is a state maintained by a NAS layer, that is, a NAS signaling connection between UE and a core network still exists, and a signaling connection between the UE and a RAN does not exist.

Alternatively, assuming that a terminal device currently has N bearers and M sessions, when each of the N bearers meets a condition (that is, the condition 2) for triggering to enter the bearer inactive state, and each of the M sessions meets a condition (that is, the condition 1) for triggering to enter the session inactive state, it may be determined that the terminal device enters the terminal inactive state.

After the terminal device enters the terminal inactive state, a core network device, an access device, and the terminal device may retain a context of the terminal device, and the access device does not perceive a behavior of the terminal device when the terminal device moves inside an RNA.

It should be understood that the foregoing enumerated conditions are merely examples of the condition for entering the terminal inactive state, and this application is not limited thereto. All other conditions that can be used to determine whether the terminal enters the terminal inactive state fall within the protection scope of this application.

In addition, in this application, after the terminal device enters the inactive state, if any one of the following events occurs on the terminal device or the access device, it may be determined that the terminal device ends the inactive state.

Event 1: A timer expires (in other words, times out).

Specifically, after the terminal device enters the inactive state, the terminal device (and/or the access device) may enable a timer. In addition, if the terminal device still has no data to transmit until the timer expires (in other words, times out), the terminal device (and/or the access device) may determine that the terminal device ends the inactive state. In addition, for example, the terminal device (and/or the access device) may determine that the terminal device enters an idle (idle) state or a connected state. For example, the access device may initiate paging to the terminal device, so that the terminal device enters the connected state, or the access device initiates an RRC connection release command to the terminal device, so that the terminal device enters the idle state.

Event 2: The terminal device performs a periodic RNAU.

Specifically, for the terminal device that enters the inactive state, if a periodic RNAU is configured, when the RNAU is performed and the access device detects the RNAU, the access device needs to notify a source access device that the inactive state of the terminal device ends.

Event 3: The terminal device needs to transmit data.

Specifically, if the terminal device that enters the inactive state needs to transmit data (for example, needs to send uplink data), the terminal device may end the inactive state, for example, may enter a connected state.

Alternatively, in this application, after a session of the terminal device enters the inactive state, if any one of the following events occurs on the terminal device or the access device, it may be determined that the terminal device ends the inactive state of the session.

Event 4: A Timer Expires (in Other Words, Times Out).

Specifically, after a session of the terminal device enters the inactive state, the terminal device (and/or the access device) may enable a timer. In addition, if no data is transmitted in the session of the terminal device until the timer expires (in other words, times out), the terminal device (and/or the access device) may determine that the inactive state of the session of the terminal device ends. In addition, for example, the terminal device (and/or the access device) may determine to release the session or activate the session of the terminal device.

The timer is an inactive state timer at a session granularity (in other words, in a session inactive state type).

Event 5: The access device indicates to change a status of a session of the terminal device.

Specifically, for the terminal device whose session enters the inactive state, if the terminal device detects indication information sent by the access device, the inactive state of the session may end. For example, the terminal device may reactivate the session.

Event 6: The terminal device needs to transmit data.

Specifically, for the terminal device whose session enters the inactive state, if the session has a service, the inactive state may end. For example, the terminal device may actively activate the session.

Alternatively, in this application, after a bearer of the terminal device enters the inactive state, if any one of the following events occurs on the terminal device or the access device, it may be determined that the inactive state of the bearer of the terminal device ends.

Event 7: A timer expires (in other words, times out).

Specifically, after a bearer of the terminal device enters the inactive state, the terminal device (and/or the access device) may enable a timer. In addition, if no data is transmitted on the bearer of the terminal device until the timer expires (in other words, times out), the terminal device (and/or the access device) may determine that the inactive state of the bearer of the terminal device ends. In addition, for example, the terminal device (and/or the access device) may determine to release the bearer of the terminal device or re-establish the bearer.

The timer is an inactive state timer at a bearer granularity (in other words, in a bearer inactive state type).

Event 8: The access device indicates to change a status of a bearer of the terminal device.

Specifically, for the terminal device whose bearer enters the inactive state, if the terminal device detects indication information sent by the access device, the inactive state of the bearer may end. For example, the bearer may be re-established.

It should be understood that the foregoing enumerated events are only examples of an event that triggers the terminal device to end the inactive state, and this application is not limited thereto. All other events that can be used to trigger the terminal device to end the inactive state fall within the protection scope of this application.

The following describes an RNAU in this application.

Specifically, an access device may configure, for a terminal device served by the access device, a radio network area in which the terminal device is in an inactive state. The radio network area may be referred to as a radio network access network based notification area (RAN based notification area, RNA). The access device may deliver information about the RNA to the terminal device by using dedicated signaling.

In this application, the RNA may cover one or more cells.

For example, the access device (gNB) may provide an explicit cell list for the terminal device as the RNA.

For another example, the access device (gNB) may provide a RAN area ID list for the terminal device as the RNA. Herein, the RAN area may be a subset of a CN tracking area or may be a CN tracking area, one RAN area corresponds to one RAN area ID, and one RAN area includes a TAI and an optional RAN area code.

A RAN area ID of a cell is broadcast in the cell by using system information of the cell.

When the terminal device in the inactive state reselects a cell in the RNA, the terminal device may not notify a network, and when the terminal device in the inactive state reselects a cell outside the RNA, the terminal device may notify the network.

Therefore, when the access device needs to page the terminal device in the inactive state, the access device may perform paging in the cell in the RNA.

In this application, an RNA update (that is, an RNAU) may be performed.

In addition, owing to different causes of the RNAU, the RNAU may be classified into the following a plurality of types:

Type α: RNAU caused by movement of the terminal device. To be specific, an RNAU needs to be performed when the terminal device moves out of an RNA allocated by the access device to the terminal device.

Type β: RNAU that is periodically performed, or RNAU that is performed when an RNA timer expires, where the RNA timer may be configured by a base station.

It should be understood that the foregoing listed types of the RNAU are merely examples for description, and this application is not limited thereto. Other methods or manners for classifying the RNAU fall within the protection scope of this application.

As an example instead of a limitation, the RNAU in this application may include the following process.

1. UE may recover from an inactive state and provide a newly accessed gNB with an I-RNTI allocated by a last serving gNB and a proper cause value, for example, a RAN based notification area update.

2. If an identity of the gNB included in the I-RNTI can be obtained through parsing, the newly accessed gNB requests the last serving gNB to provide a UE context.

3. The last serving gNB provides the UE context.

4. The newly accessed gNB may switch the UE to an RRC_CONNECTED state, switch the UE back to the RRC INACTIVE state, or switch the UE to an RRC_IDLE state. It should be noted that, if the UE is switched to the RRC_IDLE state, subsequent steps do not need to be performed.

5. To prevent loss of downlink user data buffered in the last serving gNB, the newly accessed gNB provides a downlink data forwarding address for the last serving gNB.

6. The newly accessed gNB performs path switching (sends a path switching request message to a serving AMF).

7. The AMF returns a path switching response message.

8. The AMF notifies the last serving gNB to release the UE context.

Figure 5:
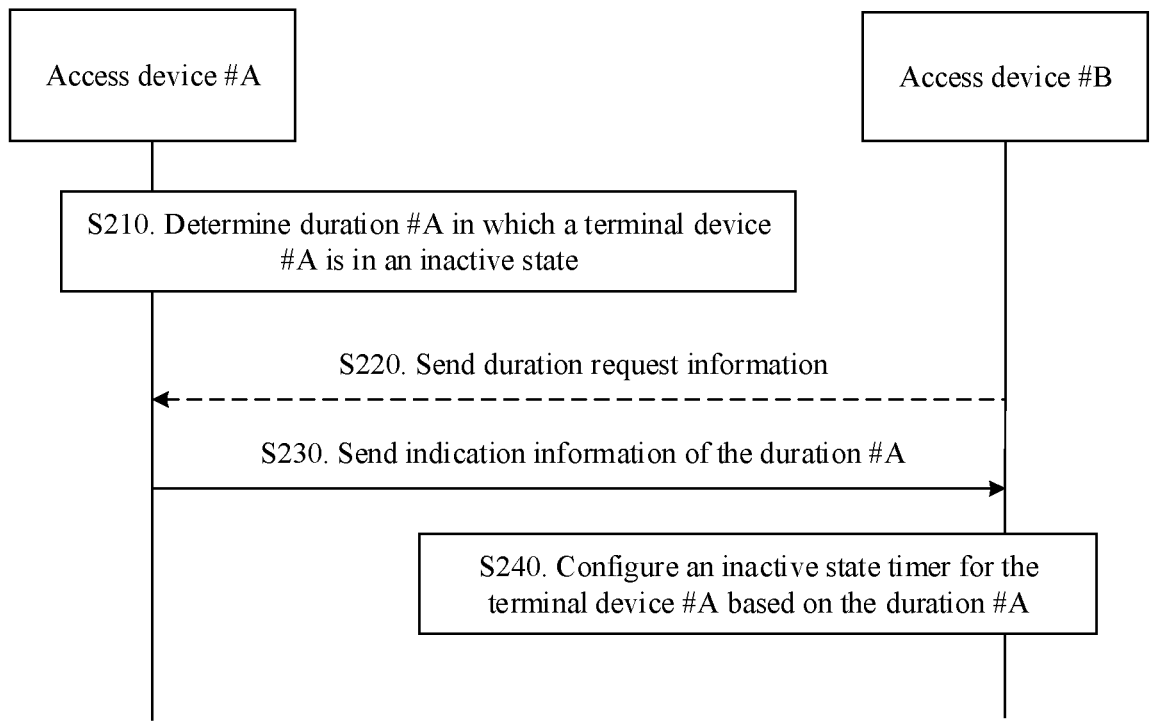
FIG. 5 is a schematic interaction diagram of an example of a wireless communication process according to this application.

FIG. 5 is a schematic flowchart of an example of a wireless communication method 200 according to this application, and the method 200 shows a process of interaction between an access device #A and an access device #B.

As an example instead of a limitation, the method 200 may be used in any one of the following scenarios:

Scenario 1: A terminal device #A is handed over from the access device #A to the access device #B.

Scenario 2: The access device #A may be a primary base station, and the access device #B may be a secondary base station. A camping base station of a terminal device #A changes from another base station (for example, the access device #A or another secondary base station of the access device #A) to the access device #B.

Scenario 3: The access device #A may be an original camping base station of a terminal device #A, or the access device #A may be a new camping base station of a terminal device #A.

As an example instead of a limitation, when the terminal device #A camps on the access device #A, the terminal device #A may enter an inactive state. In addition, in this application, the terminal device #A may enter the inactive state for once or N times, where N is an integer greater than 1.

For understanding and description, a processing process of the method 200 is described below by using an example in which the terminal device #A enters the inactive state for the $i^{th}$ time when camping on the access device #A, where i is an integer greater than or equal to 1, and i is an integer less than or equal to N.

It is assumed that the terminal device #A enters the inactive state for the $i^{th}$ time at a moment #A.

A type of the $i^{th}$ inactive state may be any one of the foregoing type 1 to type 3. This is not particularly limited in this application.

In addition, it is assumed that the terminal device #A ends the $i^{th}$ inactive state at a moment #B.

An event that triggers the terminal device to end the $i^{th}$ inactive state may be any one of the foregoing event 1 to event 3. This is not particularly limited in this application.

In this case, in S210, the access device #A may determine duration (denoted as duration #A) of the $i^{th}$ inactive state of the terminal device #A. To be specific, the duration #A may be duration between the moment #A and the moment #B.

As an example instead of a limitation, in this application, the access device #A may determine the duration #A in any one of the following manners.

Manner 1: For example, in this application, if the access device #A can learn that the terminal device #A enters the inactive state for the $i^{th}$ time at the moment #A, the access device #A may record the moment #A. In addition, if the access device #A can learn that the terminal device #A ends the $i^{th}$ inactive state at the moment #B, the access device #A may record the moment #B. Therefore, the access device #A may determine the duration #A based on the moment #A and the moment #B.

Manner 2: For another example, in this application, the terminal device #A may report information about the moment #A and information about the moment #B to the access device #A, so that the access device #A may determine the moment #A and the moment #B, and further determine the duration #A based on the moment #A and the moment #B. It should be noted that the information about the moment #A may be immediately sent by the terminal device #A after the terminal device #A enters the inactive state, or may be sent by the terminal device #A after any duration after the terminal device #A enters the inactive state. This is not particularly limited in this application. Similarly, the information about the moment #B may be immediately sent by the terminal device #A after the terminal device #A ends the inactive state, or may be sent by the terminal device #A after any duration after the terminal device #A ends the inactive state. This is not particularly limited in this application.

Optionally, the terminal device #A may report the moment #A and the moment #B to the access device #A via another access device. For example, after entering the inactive state in the access device #A, the terminal device #A records the moment #A, and moves to the another access device. In this case, when terminal device #A ends the inactive state in the another access device, the UE records the moment #B. In this case, the moment #A and the moment #B may be first reported to the another access device, and then the another access device sends the moment #A and the moment #B to the access device #A.

Manner 3: For another example, in this application, after entering the inactive state, the terminal device #A may report an inactive state start indication to the access device #A at a moment #C, and after ending the inactive state, the terminal device #A may report an inactive state end indication to the access device #A at a moment #D. There is a preset time interval #1 between the moment #C and the moment #A, and there is a preset time interval #2 between the moment #D and the moment #B. Therefore, the access device #A may deduce the moment #A based on the moment #C and the time interval #1, and deduce the moment #B based on the moment #D and the time interval #2, so that the access device #A may determine the moment #A and the moment #B, and further determine the duration #A based on the moment #A and the moment #B. The time interval #1 and the time interval #2 may be time intervals specified in a communication system or a communication protocol, or may be time intervals configured by an access device #A. This is not particularly limited in this application.

Optionally, the terminal device #A may report the moment A and the moment B to the access device #A via another access device. Details are the same as those described above, and are not described herein again.

Manner 4: For another example, in this application, the terminal device #A may determine the duration #A based on the moment #A and the moment #B, and send information about the duration #A to the access device #A. Therefore, the access device #A may determine the duration #A based on the information about the duration #A.

Optionally, the terminal device #A may report the information about the duration #A to the access device #A via another access device.

As described above, the access device (in other words, a RAN device) in this application may include a CU and a DU, and the CU may include a CU-CP and a CU-UP.

In other words, the access device #A may include the CU, or the access device #A may include the CU-CP (that is, a case 2). The following separately describes solutions in which the access device #A determines the duration #A in the foregoing two cases.

Case 1: An access device #C (that is, the DU) may record the moment #A and the moment #B (for example, based on any one of the foregoing manner 1 to manner 3), and send the information about the moment #A and the information about the moment #B to the access device #A, so that the access device #A may determine the duration #A based on the moment #A and the moment #B. Optionally, the information about the moment #B may be recorded and sent to the access device #A by another access device #C or another access device #A.

For another example, an access device #C (that is, the DU) may determine the duration #A (for example, based on any one of the foregoing manner 1 to manner 4), and send the information about the duration #A to the access device #A, so that the access device #A may determine the duration #A based on the information about the duration #A. Optionally, the information about the duration #A may be recorded and sent to the access device #A by another access device #C or another access device #A.

In addition, in the case 1, the information about the moment #A, the information about the moment #B, or the information about the duration #A may be carried in an interface message between the CU and the DU, for example, an F1 interface message (for example, an F1 interface deactivation notification message).

In addition, optionally, the access device #A may further send a monitoring request #1 to the access device #C. The monitoring request #1 may be used to indicate the access device #C to monitor a moment at which the terminal device #A enters the inactive state and a moment at which the terminal device #A ends the inactive state. In other words, the monitoring request #1 may be used to indicate the access device #C to record the duration in which the terminal device #A is in the inactive state, so that the access device #C can send, based on the monitoring request #1, the information about the moment #A, the information about the moment #B, or the information about the duration #A.

Case 2: An access device #D (that is, the CU-UP) may record the moment #A and the moment #B (for example, based on any one of the foregoing manner 1 to manner 3), and send the information about the moment #A and the information about the moment #B to the access device #A, so that the access device #A may determine the duration #A based on the moment #A and the moment #B. Optionally, the information about the moment #B may be recorded and sent to the access device #A by another access device #C or another access device #A.

For another example, an access device #D (that is, the CU-UP) may determine the duration #A (for example, based on any one of the foregoing manner 1 to manner 4), and send the information about the duration #A to the access device #A, so that the access device #A may determine the duration #A based on the information about the duration #A. Optionally, the information about the duration #A may be recorded and sent to the access device #A by another access device #C or another access device #A.

In addition, in the case 2, the information about the moment #A, the information about the moment #B, or the information about the duration #A may be carried in an interface message between the CU-UP and the CU-CP, for example, an E1 interface message (for example, an E1 interface deactivation notification message).

In addition, optionally, the access device #A may further send a monitoring request #2 to the access device #D. The monitoring request #2 may be used to indicate the access device #D to monitor a moment at which the terminal device #A enters the inactive state and a moment at which the terminal device #A ends the inactive state. In other words, the monitoring request #2 may be used to indicate the access device #D to record the duration in which the terminal device #A is in the inactive state, so that the access device #D can send, based on the monitoring request #2, the information about the moment #A, the information about the moment #B, or the information about the duration #A.

Optionally, the access device #A may further determine the type (that is, any one of the foregoing type 1 to type 3) of the $i^{th}$ inactive state.

For example, in the case 1 or the case 2, the monitoring request #1 or the monitoring request #2 may further carry type indication information #1, and the type indication information #1 may be used to indicate a type (that is, any one of the foregoing type 1 to type 3) of an inactive state that needs to be monitored by the DU.

For another example, when the duration #A is determined based on any one of the foregoing manner 2 to manner 4, the access device #A may send type indication information #2 to the terminal device #A, and the type indication information #2 may be used to indicate a type (that is, any one of the foregoing type 1 to type 3) of an inactive state that needs to be monitored by the terminal device #A.

Optionally, the access device may further determine a cell #A, and the cell #A is a cell in which the terminal device #A is located (for example, a cell on which the terminal device #A camps) when the terminal device #A enters the inactive state for the $i^{th}$ time. In addition, the access device #A may further record a correspondence between the duration #A and the cell #A.

For example, in the case 1 or the case 2, the monitoring request #1 or the monitoring request #2 may further carry cell report request information #1, and the cell report request information #1 may be used to request the DU to monitor and report a cell in which the terminal device #A is located (for example, a cell on which the terminal device #A camps) when the terminal device #A enters the inactive state.

Alternatively, the DU may actively report a cell in which the terminal device #A is located (for example, a cell on which the terminal device #A camps) when the terminal device #A enters the inactive state.

For another example, when the duration #A is determined based on any one of the foregoing manner 2 to manner 4, the access device #A may send cell report request information #2 to the terminal device #A, and the cell report request information #2 may be used to request the access device #A to monitor and report a cell in which the terminal device #A in the inactive state is located (for example, a cell on which the terminal device #A in the inactive state camps).

Optionally, the access device may further determine a type #A, and the type #A is the type of the $i^{th}$ inactive state. In addition, the access device #A may further record a correspondence between the duration #A and the type #A.

Optionally, the access device #A may record the information about the duration #A in UE history information (UE history information) of the terminal device #A, or may record the information about the duration #A in a new information element. This is not limited in this application.

As an example instead of a limitation, the UE history information in this application may include information in the following form:

--- information element (IE)/group name
last visited cell list
>last visited cell information
>>last visited cell information that UE served in inactive state
>>>cell global identifier (E-UTRAN cell global identifier, ECGI)
>>>time spent

---

Specifically, the ECGI may be an ECGI of a cell (for example, the cell #A) in which the terminal device in the inactive state is located. Optionally, the information element may alternatively be a PCI of a cell (for example, the cell #A). The information element is optional.

The time spent is duration (for example, the duration #A) in which the terminal device is in the inactive state.

It should be understood that the foregoing enumerated specific form of the UE history information is merely an example for description, and this application is not limited thereto.

For example, the UE history information may further include a type (for example, the type #A) of the inactive state corresponding to the duration.

For another example, the UE history information may record duration corresponding to a plurality of times of the inactive state in a cell, or record duration corresponding to a plurality of times of the inactive state in different cells. In this case, the information element of the time spent may exist in a form of a list. This is not specifically limited in this application.

In S230, the access device #A may send the information about the duration #A to the access device #B.

Optionally, the access device #A may further send information about the cell #A to the access device #B.

In other words, the access device #A may further send information about the correspondence between the duration #A and the cell #A to the access device #B.

Optionally, the access device #A may further send information about the type #A to the access device #B.

In other words, the access device #A may further send, to the access device #B, information about a type (that is, the type #A) of an inactive state (that is, the $i^{th}$ inactive state) corresponding to the duration #A.

For example, as an example instead of a limitation, the foregoing information may be carried in the history information of the terminal device #A.

Optionally, the information about the duration #A may be sent by the access device #A based on a request of the access device #B. To be specific, in S220, the access device #B may send duration request information to the access device #A, where the duration request information may be used to request the access device #A to send the duration in which the terminal device #A is in the inactive state (specifically, the duration request information may be used to request the access device #A to send the duration in which the terminal device #A is in the inactive state for once).

Optionally, the duration request information may further include type request information. The type request information may be used to indicate an inactive state type corresponding to duration that the access device #B expects the access device #A to provide. In other words, the type request information may be used to indicate duration of a specific inactive state type that the access device #B expects the access device #A to provide.

That is, the type #A may be determined by the access device #A based on the type request information, or the type #A may be a type indicated by the type request information.

As an example instead of a limitation, for example, in the foregoing scenario 1, the duration request information may be carried in a context request message, and the information about the duration #A may be carried in a context request response message or another Xn interface message. In addition, the context request message may be sent by the access device #B based on a radio resource control (RRC) resume request (RRC resume request) message sent by the access device #A.

For another example, in the foregoing scenario 2, the information about the duration #A may be carried in a secondary base station change request message or another E-UTRA-NR dual connectivity (EN-DC) Xn interface message.

For another example, in this application, data or information may be transmitted between the access device #A and the access device #B via a core network device. For example, the access device #A may send the information about the duration #A to the core network device, and the core network device may forward the information about the duration #A to the access device #B.

Therefore, in S240, the access device #B (that is, an access device on which the terminal device #A newly camps) may obtain the information about the duration #A, to configure an inactive state timer (timer) based on the duration #A.

For example, as an example instead of a limitation, it is assumed that original duration of the inactive state timer that is configured by the access device #B is duration #B.

In this case, the access device #B may adjust the duration #B based on the duration #A.

For example, if the duration #A is greater than the duration #B, the access device #B may adjust the timer, to prolong the duration #B.

For another example, if the duration #A is less than the duration #B, the access device #B may adjust the timer, to shorten the duration #B.

For another example, the access device #B may adjust the timer, so that a difference between the duration #B and the duration #A falls within a preset difference range.

For another example, the access device #B may further determine the inactive state (that is, the type #A) corresponding to the duration #A, and determine duration of an inactive state timer correspond to the type #A as a configuration object (that is, the duration #B).

According to the wireless communication method provided in this application, the source camping access device #A of the terminal device #A records the duration #A in which the terminal device #A is in the inactive state, and the access device #A sends the information about the duration #A to the new camping access device #B of the terminal device #A. Therefore, the access device #B may configure the inactive state timer based on the duration #A. In other words, according to the wireless communication method provided in this application, a reference and a basis can be provided for setting the timer. Therefore, increases in signaling overheads and device power consumption that are caused by improper setting of the timer can be avoided, and signaling overheads and power consumption of the terminal device can be reduced, thereby improving user experience.

It should be understood that the foregoing enumerated method used for the duration #A is merely an example for description, and this application is not limited thereto.

For example, the access device may further reconfigure duration (denoted as duration #C) of the inactive state timer for the terminal device #A at the moment #C (a moment after the moment #B).

For example, if the duration #A is greater than the duration #C, the access device #A may adjust the timer, to prolong the duration #C.

For another example, if the duration #A is less than the duration #C, the access device #A may adjust the timer, to shorten the duration #C.

For another example, the access device #A may adjust the timer, so that a difference between the duration #C and the duration #A falls within a preset difference range.

For another example, the access device #A may further determine the inactive state (that is, the type #A) corresponding to the duration #A, and determine duration of an inactive state timer correspond to the type #A as a configuration object (that is, the duration #C).

It should be noted that, as described above, before the terminal device #A moves to coverage of the access device #B, in other words, when the terminal device #A moves in coverage of the access device #A, the terminal device #A may be in the inactive state for a plurality of times. Therefore, the access device #A may record duration of each of the plurality of times of the inactive state. In addition, a process of determining, recording, transmission, and use of the duration may be similar to that of the duration (that is, the duration #A) in which the terminal device #A is in the inactive state for the $i^{th}$ time. To avoid repetition, detailed descriptions thereof are omitted herein.

In other words, the history information of the terminal device #A may include a duration list, and the duration list may include information about duration of the plurality of times of the inactive state of the terminal device #A.

Figure 6:
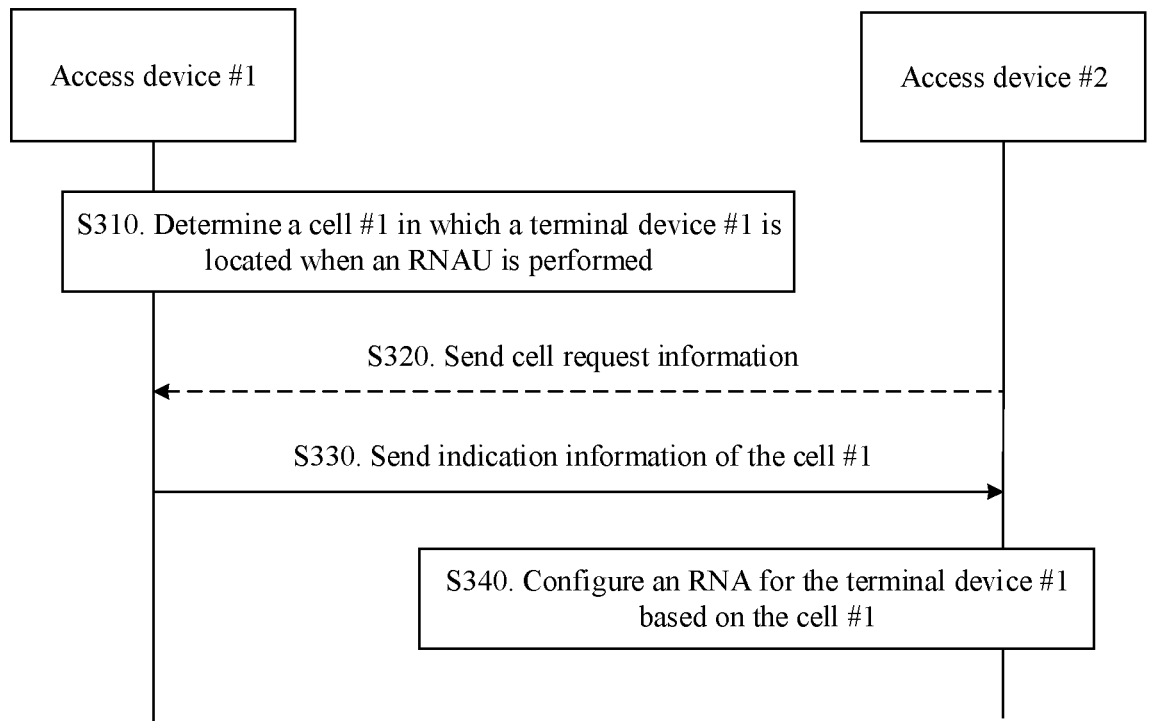
FIG. 6 is a schematic interaction diagram of another example of a wireless communication process according to this application.

FIG. 6 is a schematic flowchart of an example of a wireless communication method 300 according to this application, and the method 300 shows a process of interaction between an access device #1 and an access device #2.

As an example instead of a limitation, the method 300 may be used in at least one of the following scenarios:

Scenario 1: A terminal device #1 is handed over from the access device #1 to the access device #2.

Scenario 2: The access device #1 may be a primary base station, and the access device #2 may be a secondary base station. A camping base station of a terminal device #1 changes from another base station (for example, the access device #1 or another secondary base station of the access device #1) to the access device #2.

Scenario 3: The access device #1 may be an original camping base station of a terminal device #1, or the access device #1 may be a new camping base station of a terminal device #1.

As an example instead of a limitation, during moving of the terminal device #1, the terminal device #1 may perform an RNAU. In addition, in this application, the terminal device #1 may perform the RNAU for once or M times, where M is an integer greater than 1.

For ease of understanding and description, a processing process of the method 300 is described below by using an example in which the RNAU is performed for the $j^{th}$ time when the terminal device #1 moves, where j is an integer greater than or equal to 1, and j is an integer less than or equal to M.

A type of the $j^{th}$ RNAU may be any one of the foregoing type α to type β. This is not particularly limited in this application.

In this case, in S310, the access device #1 may determine a cell (denoted as a cell #1) in which the terminal device #1 is located when the RNAU is performed for the $j^{th}$ time.

As an example instead of a limitation, in this application, the access device #1 may determine the cell #1 in any one of the following manners.

Manner 1: The access device #1 may record the cell in which the terminal device #1 is located when the RNAU is performed for the $j^{th}$ time.

Manner 2: When the RNAU is performed for the $j^{th}$ time, the terminal device #1 may report information about the cell #1 to the access device #1.

Therefore, the access device #1 may record the information about the cell #1.

As an example instead of a limitation, the information about the cell #1 may include but is not limited to a physical cell identifier PCI (PCI), a cell global identifier (CGI), or the like of the cell #1.

Optionally, the access device #1 may further determine a type #1, and the type #1 is a type when the terminal device #1 performs the RNAU for the $j^{th}$ time. In addition, the access device #1 may further record a correspondence between the cell #1 and the type #1.

Optionally, the access device #1 may record the foregoing information in UE history information of the terminal device #1, or in a newly defined information element. This is not limited in this application.

As an example instead of a limitation, the UE history information in this application may include information in the following form:

---
IE/Group Name
last visited cell list
>last visited cell information
>>last visited cell information that UE has RNAU
>>>Cell global identifier (E-UTRAN cell global identifier, ECGI)
>>>RNAU type

---

Specifically, the ECGI may be an ECGI of a cell (for example, the cell #1) in which the terminal device is located when the RNAU is performed. Alternatively, the ECGI may be a PCI of a cell.

It should be understood that the foregoing enumerated specific form of the UE history information is merely an example for description, and this application is not limited thereto.

For example, the UE history information may record information about a cell corresponding to the RNAU performed for a plurality of times.

In S330, the access device #1 may send the information about the cell #1 to the access device #2.

Optionally, the access device #1 may further send information about the type #1 to the access device #2.

In other words, the access device #1 may further send information about the correspondence between the cell #1 and the type #1 to the access device #2.

For example, as an example instead of a limitation, the foregoing information may be carried in the history information of the terminal device #1.

Optionally, the information about the cell #1 may be sent by the access device #1 based on a request of the access device #2. To be specific, in S320, the access device #2 may send cell request information to the access device #1, where the cell request information may be used to request the access device #1 to notify a cell in which the terminal device #1 is located when the RNAU is performed.

Optionally, the cell request information may further include type request information. The type request information may be used to indicate an RNAU type corresponding to a cell that the access device #2 expects the access device #1 to provide. In other words, the type request information may be used to indicate a cell that the access device #2 expects the access device #1 to provide when a specific RNAU is performed.

That is, the type #1 may be determined by the access device #1 based on the type request information, or the type #1 may be a type indicated by the type request information.

As an example instead of a limitation, for example, in the foregoing scenario 1, the cell request information may be carried in a context request message, and the information about the cell #1 may be carried in a context request response message or another Xn interface message. In addition, the context request message may be sent by the access device #2 based on a radio resource control (radio resource control, RRC) resume request (RRC resume request) message sent by the access device #1.

For another example, in the foregoing scenario 2, the information about the cell #1 may be carried in a secondary base station change request message or another EN-DC Xn interface message.

For another example, in this application, data or information may be transmitted between the access device #1 and the access device #2 via a core network device. For example, the access device #1 may send the information about the cell #1 to the core network device, and the core network device may forward the information about the cell #1 to the access device #2.

Therefore, in S340, the access device #2 (that is, the access device on which the terminal device #1 newly camps) may obtain the information about the cell #1, so that an RNA can be configured for the terminal device #1 based on the cell #1.

For example, as an example instead of a limitation, it is assumed that cells included in the RNA configured by the access device #2 for the terminal device #1 form a cell set #X.

In this case, the access device #2 may adjust the cell set #X based on the cell #1, or adjust, based on the cell #1, the cells included in the cell set #X.

For example, if the cell #1 does not belong to the cell set #X, the access device #2 may add the cell #1 to the cell set #X.

According to the wireless communication method provided in this application, the source camping access device #1 of the terminal device #1 records the cell #1 in which the terminal device #1 is located when the RNAU is performed, and the access device #1 sends the information about the cell #1 to the new camping access device #2 of the terminal device #1. Therefore, the access device #2 may configure the RNA for the terminal device #1 based on the cell #1. In other words, according to the wireless communication method provided in this application, a reference and a basis can be provided for setting the RNA. Therefore, increases in signaling overheads and device power consumption that are caused by improper setting of the RNA can be avoided, and signaling overheads and power consumption of the terminal device can be reduced, thereby improving user experience.

It should be understood that the foregoing enumerated method used for the cell #1 is merely an example for description, and this application is not limited thereto.

For example, the access device #1 may further reconfigure an RNA for the terminal device #1 at a moment #2 (a moment after the moment #1, where the moment #1 is a moment at which the RNAU is performed for the $j^{th}$ time), and it is assumed that cells included in the reconfigured RNA form a cell set #Y.

For example, if the cell #1 does not belong to the cell set #Y, the access device #1 may add the cell #1 to the cell set #Y.

It should be noted that, as described above, before the terminal device #1 moves to coverage of the access device #2, the RNAU may be performed for a plurality of times. Therefore, the access device #A may record a cell in which the RNAU is performed for each of the plurality of times. In addition, a process of determining, recording, transmission, and use of the information about the cell may be similar to that of a cell in which the terminal device #1 performs the RNAU for the $j^{th}$ time. To avoid repetition, detailed descriptions thereof are omitted herein.

In other words, the history information of the terminal device #1 may include a list of cells in which the RNAU is performed, and the cell list may include at least one of information about cells in which the RNAU is performed for a plurality of times and an RNAU type that are of the terminal device #1.

Figure 7:
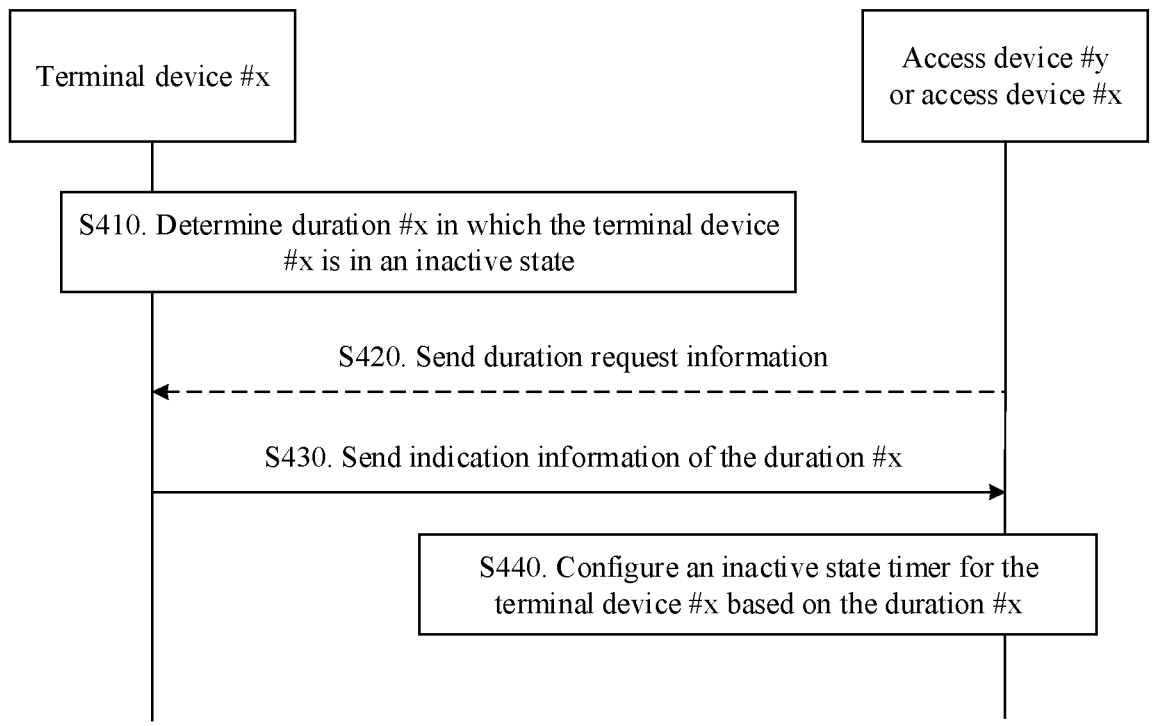
FIG. 7 is a schematic interaction diagram of still another example of a wireless communication process according to this application.

FIG. 7 is a schematic flowchart of an example of a wireless communication method 400 according to this application, and the method 400 shows a process of interaction between a terminal device #x and an access device #y.

As an example instead of a limitation, the method 400 may be used in at least one of the following scenarios:

Scenario 1: The terminal device #x is handed over from the access device #x to the access device #y.

Scenario 2: The access device #x may be a primary base station, and the access device #y may be a secondary base station. A camping base station of the terminal device #x changes from another base station (for example, the access device #x or another secondary base station of the access device #x) to the access device #y.

Scenario 3: The access device #x may be an original camping base station of the terminal device #x, or the access device #y may be a new camping base station of the terminal device #x.

As an example instead of a limitation, when the terminal device #x camps on the access device #x, the terminal device #x may enter an inactive state. In addition, in this application, the terminal device #x may enter the inactive state for once or K times, where K is an integer greater than 1.

For understanding and description, a processing process of the method 400 is described below by using an example in which the terminal device #x enters the inactive state for the $k^{th}$ time when camping on the access device #x, where k is an integer greater than or equal to 1, and k is an integer less than or equal to K.

It is assumed that the terminal device #x enters the inactive state for the $k^{th}$ time at a moment #x.

A type of the $k^{th}$ inactive state may be any one of the foregoing type 1 to type 3. This is not particularly limited in this application.

In addition, it is assumed that the terminal device #x ends the $k^{th}$ inactive state at a moment #y.

An event that triggers the terminal device to end the $k^{th}$ inactive state may be any one of the foregoing event 1 to event 7. This is not particularly limited in this application.

In this case, in S410, the terminal device #x may record duration (denoted as duration #x) of the $k^{th}$ inactive state of the terminal device #x. To be specific, the duration #x may be duration between the moment #x and the moment #y.

Optionally, the terminal device #x may further determine a type #x, and the type #x is a type for entering the inactive state for the $k^{th}$ time. In addition, the terminal device #x may further record a correspondence between the duration #x and the type #x.

Optionally, the terminal device #x may further record a cell #k. The cell #k is a cell in which the terminal device has been in the inactive state for the $k^{th}$ time. There may be one or more cells #k. This is not particularly limited in this application.

Optionally, the terminal device #x may record information about the duration #x in UE history information of the terminal device #x, or may record information about the duration #x in a new information element. This is not limited in this application.

As an example instead of a limitation, the UE history information in this application may include information in the following form:

---
IE/Group Name
last visited cell list
>last visited cell information
>>last visited cell information that UE served in inactive state
>>>Cell global identifier (E-UTRAN cell global identifier, ECGI)
>>>Time spent
---

Specifically, the ECGI may be an ECGI of a cell (for example, the cell #k) in which the terminal device is located when the terminal device is in the inactive state. Alternatively, the ECGI may be a PCI of a cell. The information element is optional.

The time spent is duration (for example, the duration #xx in which the terminal device is in the inactive state.

It should be understood that the foregoing enumerated specific form of the UE history information is merely an example for description, and this application is not limited thereto.

For example, the UE history information may further include a type (for example, the type #k) of the inactive state corresponding to the duration.

For another example, the UE history information may record duration corresponding to a plurality of times of the inactive state.

In S430, the terminal device #x may send information about the duration #x to the access device #y (or the access device #x).

Optionally, the terminal device #x may further send information about the cell #k to the access device #y (or the access device #x).

In other words, the terminal device #x may further send information about a correspondence between the duration #x and the cell #k to the access device #y (or the access device #x).

Optionally, the access device #y (or the access device #x) may further send information about the type #k to the terminal device #x.

In other words, the access device #y (or the access device #x) may further send, to the terminal device #x, information about a type (that is, the type #k) of an inactive state (that is, the $k^{th}$ inactive state) corresponding to the duration #x.

For example, as an example instead of a limitation, the foregoing information may be carried in the history information of the terminal device #x Optionally, the information about the duration #x may be sent by the terminal device #x based on a request of the access device #y (or the access device #x). To be specific, in S420, the access device #y (or the access device #x) may send duration request information to the terminal device #x, where the duration request information may be used to request the terminal device #x to send the duration in which the terminal device #x is in the inactive state (specifically, the duration request information may be used to request the terminal device #x to send duration in which the terminal device #x is in the inactive state once).

Optionally, the duration request information may further include type request information. The type request information may be used to indicate an inactive state type corresponding to duration that the access device #y (or the access device #x) expects the terminal device #x to provide. In other words, the type request information may be used to indicate duration of a specific inactive state type that the access device #y (or the access device #x) expects the terminal device #x to provide.

That is, the type #k may be determined by the terminal device #x based on the type request information, or the type #k may be a type indicated by the type request information.

Therefore, in S440, the access device #y (or the access device #x) may obtain the information about the duration #x, so that an inactive state timer may be configured for the terminal device #x based on the duration #x.

For example, as an example instead of a limitation, it is assumed that original duration that is of the inactive state timer and that is configured by the access device #y (or the access device #x) for the terminal device #x is duration #y.

In this case, the access device #y (or the access device #x) may adjust the duration #y based on the duration #x.

For example, if the duration #x is greater than the duration #y, the access device #y (or the access device #x) may adjust the timer, to prolong the duration #y.

For another example, if the duration #x is less than the duration #y, the access device #y (or the access device #x) may adjust the timer, to prolong the duration #y.

For another example, the access device #y (or the access device #x) may adjust the timer, so that a difference between the duration #y and the duration #x falls within a preset difference range.

For another example, the access device #y (or the access device #x) may further determine the inactive state (that is, the type #x) corresponding to the duration #x, and determine duration of an inactive state timer correspond to the type #x as a configuration object (that is, the duration #y).

It should be noted that, as described above, before the terminal device #x moves to coverage of the access device #y, in other words, when the terminal device #x moves in coverage of the access device #x, the terminal device #x may be in the inactive state for a plurality of times. Therefore, the access device #x may record duration of each of the plurality of times of the inactive state. In addition, a process of determining, recording, transmission, and use of the duration may be similar to that of the duration (that is, the duration #x) in which the terminal device #x is in the inactive state for the $k^{th}$ time. To avoid repetition, detailed descriptions thereof are omitted herein.

In other words, the history information of the terminal device #x may include a duration list, and the duration list may include information about duration of the plurality of times of the inactive state of the terminal device #x.

According to the wireless communication method provided in this application, the terminal device records the duration of being in the inactive state, and the access device configures the inactive state timer for the terminal device based on the duration. In other words, according to the wireless communication method provided in this application, a reference and a basis can be provided for setting the timer. Therefore, increases in signaling overheads and device power consumption that are caused by improper setting of the timer can be avoided, and signaling overheads and power consumption of the terminal device can be reduced, thereby improving user experience.

Figure 8:
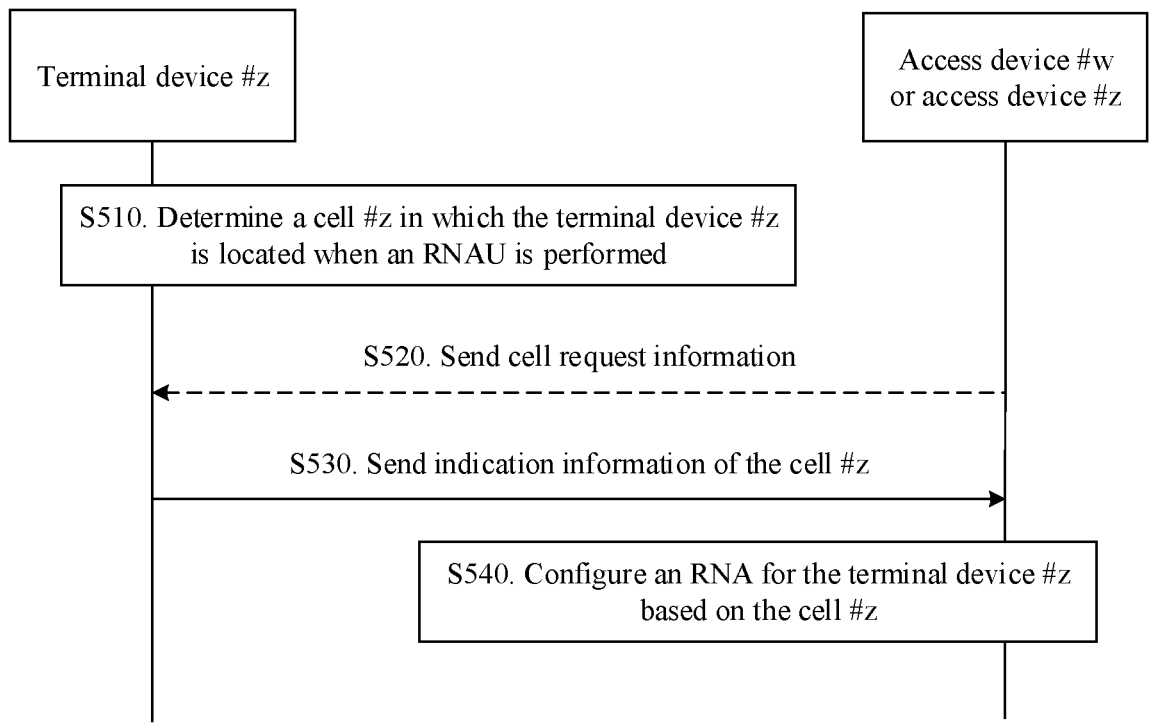
FIG. 8 is a schematic interaction diagram of still another example of a wireless communication process according to this application.

FIG. 8 is a schematic flowchart of an example of a wireless communication method 500 according to this application, and the method 500 shows a process of interaction between a terminal device #z and an access device #w (or an access device #z).

As an example instead of a limitation, the method 500 may be used in at least one of the following scenarios:

Scenario 1: The terminal device #z is handed over from the access device #z to the access device #w.

Scenario 2: The access device #z may be a primary base station, and the access device #w may be a secondary base station. A camping base station of the terminal device #z changes from another base station (for example, the access device #z or another secondary base station of the access device #z) to the access device #w.

Scenario 3: The access device #z may be an original camping base station of the terminal device #z, or the access device #z may be a new camping base station of the terminal device #z.

As an example instead of a limitation, when the terminal device #z camps on the access device #z, the terminal device #z may perform an RNAU. In addition, in this application, the terminal device #z may perform the RNAU for once or P times, where P is an integer greater than 1.

For understanding and description, a processing process of the method 500 is described below by using an example in which the RNAU is performed for the $p^{th}$ time when the terminal device #z camps on the access device #z, where p is an integer greater than or equal to 1, and p is an integer less than or equal to P.

A type of the $p^{th}$ RNAU may be any one of the foregoing type α to type β. This is not particularly limited in this application.

In this case, in S510, the terminal device #z may determine a cell (denoted as a cell #z) in which the RNAU is performed for the $p^{th}$ time.

As an example instead of a limitation, information about the cell #z may include but is not limited to a PCI, a CGI, or the like of the cell #z.

Optionally, the terminal device #z may further determine a type #z, and the type #z is a type when the terminal device z performs the RNAU for the $p^{th}$ time. In addition, the terminal device #z may further record a correspondence between the cell #z and the type #z.

Optionally, the terminal device #z may record the foregoing information in UE history information of the terminal device #z.

As an example instead of a limitation, the UE history information in this application may include information in the following form:

IE/Group Name
last visited cell list
>last visited cell information
>last visited cell information that UE has RNAU
>>>Cell global identifier (E-UTRAN cell global identifier, ECGI)
>>>RNAU type Specifically, the ECGI may be an ECGI of a cell (for example, the cell #z) in which the terminal device is located when the RNAU is performed. Alternatively, the ECGI may be a PCI of a cell.

It should be understood that the foregoing enumerated specific form of the UE history information is merely an example for description, and this application is not limited thereto.

For example, the UE history information may record information about a cell corresponding to the RNAU performed for a plurality of times.

In S530, the terminal device #z may send information about the cell #z to the access device #w (or the access device #z).

Optionally, the terminal device #z may further send information about the cell #z to the access device #w (or the access device #z).

In other words, the terminal device #z may further send information about the correspondence between the cell #z and the type #z to the access device #w (or the access device #z).

For example, as an example instead of a limitation, the foregoing information may be carried in the history information of the terminal device #z.

Optionally, the information about the cell #z may be sent by the terminal device #z based on a request of the access device #w (or the access device #z). To be specific, in S520, the access device #w (or the access device #z) may send cell request information to the terminal device #z, and the cell request information may be used to request to notify a cell in which the terminal device #z is located when the RNAU is performed.

Optionally, the cell request information may further include type request information. The type request information may be used to indicate an RNAU type corresponding to a cell that the access device #w (or the access device #z) expects the terminal device #z to provide. In other words, the type request information may be used to indicate a cell that the access device #w (or the access device #z) expects the terminal device #z to provide when a specific RNAU is performed.

That is, the type #z may be determined by the terminal device #z based on the type request information, or the type #z may be a type indicated by the type request information.

Therefore, in S540, the access device #w (or the access device #z) may obtain the information about the cell #z, so that the RNA can be configured for the terminal device #z based on the cell #z.

For example, as an example instead of a limitation, it is assumed that cells included in an RNA configured by the access device #w (or the access device #z) for the terminal device #z form a cell set #X.

In this case, the access device #w (or the access device #z) may adjust the cell set #X based on the cell #z, or adjust, based on the cell #z, the cells included in the cell set #X.

For example, if the cell #z does not belong to the cell set #X, the access device #w (or the access device #z) may add the cell #z to the cell set #X.

It should be noted that, as described above, before the terminal device #z moves to coverage of the access device #w, the RNAU may be performed for a plurality of times. Therefore, the access device #z may record a cell in which the RNAU is performed for each of the plurality of times. In addition, a process of determining, recording, transmission, and use of the information about the cell may be similar to that of a cell in which the terminal device #z performs the RNAU for the $p^{th}$ time. To avoid repetition, detailed descriptions thereof are omitted herein.

In other words, the history information of the terminal device #z may include a list of cells in which the RNAU is performed, and the cell list may include at least one of information about cells in which the RNAU is performed for a plurality of times and an RNAU type that are of the terminal device #z.

According to the wireless communication method provided in this application, the terminal device records the cell in which the RNAU is performed, and sends the information about the cell to the access device, so that the access device can configure the RNA for the terminal device based on the cell. In other words, according to the wireless communication method provided in this application, a reference and a basis can be provided for setting the RNA. Therefore, increases in signaling overheads and device power consumption that are caused by improper setting of the RNA can be avoided, and signaling overheads and power consumption of the terminal device can be reduced, thereby improving user experience.

It may be understood that in the foregoing embodiments of this application, the method implemented by the terminal device may also be implemented by a component (for example, a chip or a circuit) that can be used in the terminal device, and the method implemented by the access device may also be implemented by a component (for example, a chip or a circuit) that can be used in the access device.

Figure 9:
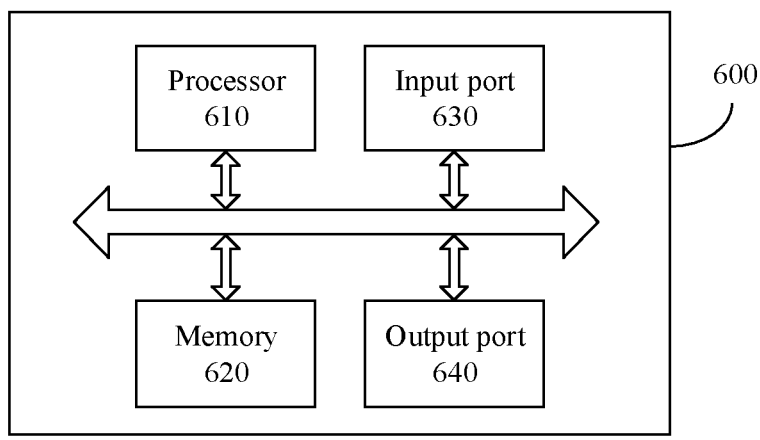
FIG. 9 is a schematic block diagram of an example of a wireless communication apparatus according to this application.

According to the foregoing method, FIG. 9 is a schematic diagram of a wireless communication apparatus 600 according to an embodiment of this application.

The apparatus 600 may be a terminal device, or may be a chip or a circuit, for example, a chip or a circuit that may be disposed in a terminal device.

Alternatively, the apparatus 600 may be an access device, or may be a chip or a circuit, for example, a chip or a circuit that may be disposed in an access device. The apparatus 600 may include a processing unit 610 (that is, an example of the processing unit) and a storage unit 620. The storage unit 620 is configured to store instructions.

The processing unit 610 is configured to execute the instructions stored in the storage unit 620, so that the apparatus 600 implements the steps performed by the terminal device (for example, the terminal device #x or the terminal device #z) in the foregoing method.

Alternatively, the processing unit 610 is configured to execute the instructions stored in the storage unit 620, so that the apparatus 600 implements the steps performed by the access device (for example, the access device #A or the access device #1) in the foregoing method.

Further, the apparatus 600 may further include an input port 630 (that is, an example of a communication unit) and an output port 640 (that is, another example of the communication unit). Further, the processing unit 610, the storage unit 620, the input port 630, and the output port 640 may communicate with each other through an internal connection path, to transmit a control signal and/or a data signal. The storage unit 620 is configured to store a computer program. The processing unit 610 may be configured to invoke the computer program from the storage unit 620 and run the computer program, to control the input port 630 to receive a signal, and control the output port 640 to send a signal, to complete the steps performed by the terminal device in the foregoing method. The storage unit 620 may be integrated into the processing unit 610, or may be disposed separately from the processing unit 610.

Optionally, if the apparatus 600 is a communication device (for example, a network device or a terminal device), the input port 630 is a receiver, and the output port 640 is a transmitter. The receiver and the transmitter may be a same physical entity or different physical entities. When being a same physical entity, the receiver and the transmitter may be collectively referred to as a transceiver.

Optionally, if the apparatus 600 is a chip or a circuit, the input port 630 is an input interface and the output port 640 is an output interface.

In an implementation, it may be considered that functions of the input port 630 and the output port 640 are implemented by using a transceiver circuit or a dedicated transceiver chip. It may be considered that the processing unit 610 may be implemented by using a dedicated processing chip, a processing circuit, a processing unit, or a universal chip.

In another implementation, it may be considered that the communication device (for example, an access device or a terminal device) provided in this embodiment of this application is implemented by using a general-purpose computer. To be specific, program code for implementing functions of the processing unit 610, the input port 630, and the output port 640 is stored in the storage unit 620, and a general-purpose processing unit implements the functions of the processing unit 610, the input port 630, and the output port 640 by executing the code in the storage unit 620.

In an implementation, the processing unit 610 is configured to determine reference information, where the reference information includes information about first duration and/or information about a first cell, the first duration includes duration in which a terminal device is in an inactive state, and the first cell includes a cell in which the terminal device performs a radio access network based notification area update RNAU; and the output port 640 is configured to send the reference information.

Optionally, the reference information further includes information about a second cell corresponding to the first duration, and the second cell includes a cell in which the terminal device in the inactive state corresponding to the first duration is located.

Optionally, the reference information further includes information about an inactive state type corresponding to the first duration, and the inactive state type includes a session inactive state type, a data radio bearer inactive state type, or a terminal device inactive state type.

Optionally, the reference information further includes information about an RNAU type corresponding to the first cell, and the RNAU type includes a periodically triggered RNAU type or a terminal device movement triggered RNAU type.

Optionally, the processing unit 610 is configured to record the reference information in history information of the terminal device.

Optionally, the output port 630 is configured to: receive request information, and send the reference information based on the request information.

Optionally, the request information includes type indication information, the type indication information is used to indicate a first inactive state type, and the first inactive state type includes the session inactive state type, the data radio bearer inactive state type, or the terminal device inactive state type; and the processing unit 610 is configured to determine the information about the first duration based on the type indication information, so that the inactive state type corresponding to the first duration is the first inactive state type.

Functions and actions of modules or units in the apparatus 600 listed above are merely examples for description. When the apparatus 600 is configured on or is a terminal device, the modules or units in the apparatus 600 may be configured to perform actions or processing processes performed by the terminal device (for example, the terminal device #x or the terminal device #z) in the foregoing method. When the apparatus 600 is configured on or is an access network device, the modules or units in the apparatus 600 may be configured to perform actions or processing processes performed by the access device (for example, the access device #A or the access device #1) in the foregoing method. To avoid repetition, detailed descriptions thereof are omitted herein.

For concepts, explanations, detailed descriptions, and other steps of the apparatus 600 that are related to the technical solutions provided in the embodiments of this application, refer to the descriptions of the content in the foregoing methods or other embodiments. Details are not described herein again.

Figure 10:
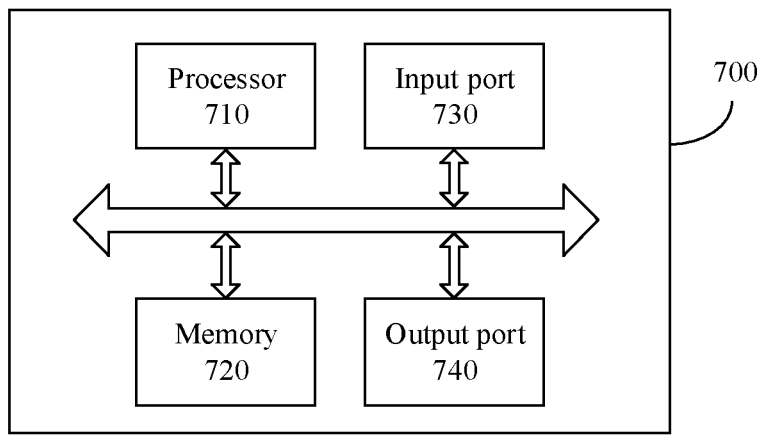
FIG. 10 is a schematic block diagram of another example of a wireless communication apparatus according to this application.

According to the foregoing method, FIG. 10 is a schematic diagram of a wireless communication apparatus 700 according to an embodiment of this application.

The apparatus 700 may be an access device (for example, the access device #B, the access device #2, the access device #y, or the access device #w), or may be a chip or a circuit, for example, a chip or a circuit that may be disposed in an access device.

The apparatus 700 may include a processing unit 710 (that is, an example of the processing unit) and a storage unit 720. The storage unit 720 is configured to store instructions.

The processing unit 710 is configured to execute the instructions stored in the storage unit 720, so that the apparatus 700 implements the steps performed by the access device (for example, the access device #B, the access device #2, the access device #y, or the access device #w) in the foregoing method.

Further, the apparatus 700 may further include an input port 730 (that is, an example of a communication unit) and an output port 740 (that is, another example of the communication unit). Further, the processing unit 710, the storage unit 720, the input port 730, and the output port 740 may communicate with each other through an internal connection path, to transmit a control signal and/or a data signal. The storage unit 720 is configured to store a computer program. The processing unit 710 may be configured to invoke the computer program from the storage unit 720 and run the computer program, to control the input port 730 to receive a signal, and control the output port 740 to send a signal, to complete the steps performed by the terminal device in the foregoing method. The storage unit 720 may be integrated into the processing unit 710, or may be disposed separately from the processing unit 710.

Optionally, if the apparatus 700 is a communication device (for example, an access device), the input port 730 is a receiver, and the output port 740 is a transmitter. The receiver and the transmitter may be a same physical entity or different physical entities. When being the same physical entity, the receiver and the transmitter may be collectively referred to as a transceiver.

Optionally, if the apparatus 700 is a chip or a circuit, the input port 730 is an input interface and the output port 740 is an output interface.

In an implementation, it may be considered that functions of the input port 730 and the output port 740 are implemented by using a transceiver circuit or a dedicated transceiver chip. It may be considered that the processing unit 710 may be implemented by using a dedicated processing chip, a processing circuit, a processing unit, or a universal chip.

In another implementation, it may be considered that the communication device (for example, an access device) provided in this embodiment of this application is implemented by using a general-purpose computer. To be specific, program code for implementing functions of the processing unit 710, the input port 730, and the output port 740 is stored in the storage unit 720, and a general-purpose processing unit implements the functions of the processing unit 710, the input port 730, and the output port 740 by executing the code in the storage unit 720.

In an implementation, the input port 730 is configured to receive reference information, where the reference information includes information about first duration and/or information about a first cell, the first duration includes duration in which a terminal device is in an inactive state, and the first cell includes a cell in which the terminal device performs a radio access network based notification area update RNAU.

The processing unit 710 is configured to adjust duration of an inactive state timer of the terminal device based on the first duration; or
  the processing unit 710 is configured to configure a radio access network based notification area RNA for the terminal device based on the first cell.

Optionally, the reference information further includes information about a second cell corresponding to the first duration, and the second cell includes a cell in which the terminal device in the inactive state corresponding to the first duration is located.

Optionally, the reference information further includes information about an inactive state type corresponding to the first duration, and the inactive state type includes a session inactive state type, a data radio bearer inactive state type, or a terminal device inactive state type; and
  the processing unit 710 is configured to adjust, based on the first duration, duration of the inactive state timer that is of the terminal device and that is in the inactive state type corresponding to the first duration.

Optionally, the reference information further includes information about an RNAU type corresponding to the first cell, and the RNAU type includes a periodically triggered RNAU type or a terminal device movement triggered RNAU type.

Optionally, the reference information is carried in history information of the terminal device.

Optionally, the output port 740 is configured to send request information, where the request information is used to request the reference information.

Optionally, the request information includes type indication information, the type indication information is used to indicate a first inactive state type, and the first inactive state type includes the session inactive state type, the data radio bearer inactive state type, or the terminal device inactive state type.

Functions and actions of modules or units in the apparatus 700 listed above are merely examples for description. When the apparatus 700 is configured on or is an access device, the modules or units in the apparatus 700 may be configured to perform actions or processing processes performed by the access device (for example, the access device #B, the access device #2, the access device #y, or the access device #w) in the foregoing method. To avoid repetition, details are omitted herein.

For concepts, explanations, detailed descriptions, and other steps of the apparatus 700 that are related to the technical solutions provided in the embodiments of this application, refer to the descriptions of the content in the foregoing methods or other embodiments. Details are not described herein again.

Figure 11:
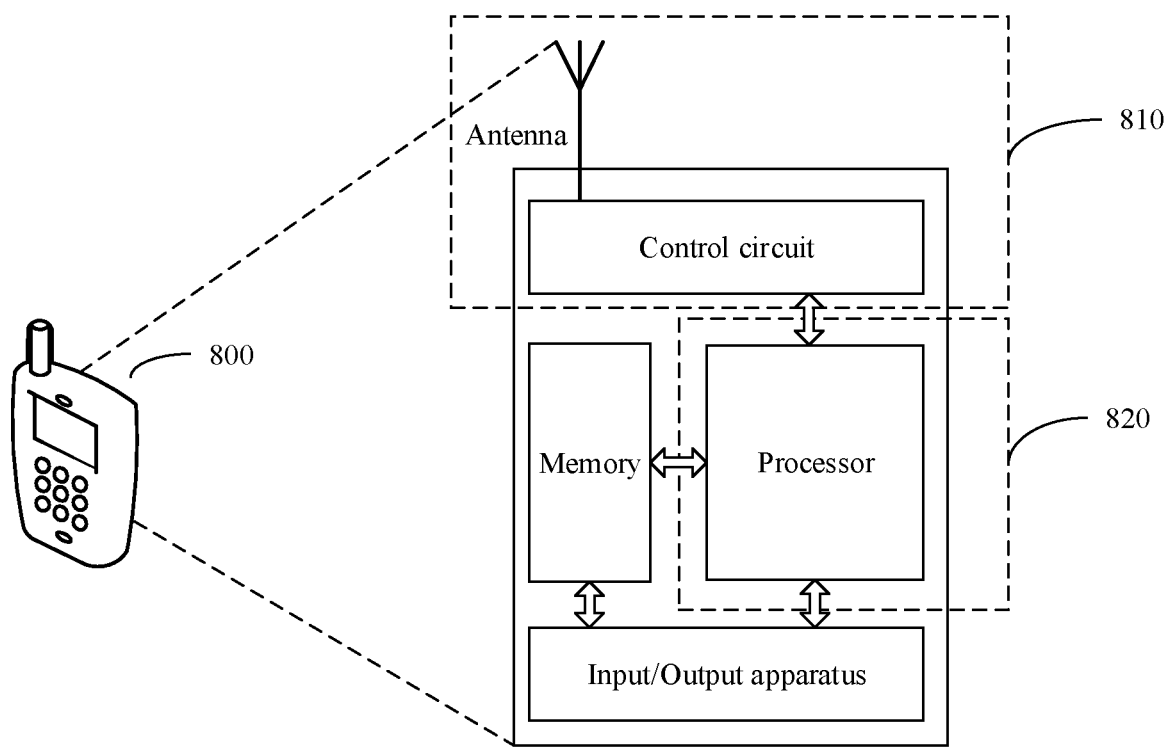
FIG. 11 is a schematic structural diagram of an example of a terminal device according to this application.

FIG. 11 is a schematic structural diagram of a terminal device 800 according to this application. The apparatus 600 may be configured in the terminal device 800, or the apparatus 600 may be the terminal device 800. In other words, the terminal device 800 may perform an action performed by the terminal device in the method 200, 300, 400, or 500.

For ease of description, FIG. 11 shows only main components of the terminal device. As shown in FIG. 11, the terminal device 800 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the actions described in the foregoing embodiments of the wireless communication method. The memory is mainly configured to store the software program and the data, for example, store a codebook described in the foregoing embodiments. The control circuit is mainly configured to perform conversion between a baseband signal and a radio frequency signal, and process the radio frequency signal. A combination of the control circuit and the antenna may also be referred to as a transceiver that is mainly configured to send and receive a radio frequency signal in a form of an electromagnetic wave. The input/output apparatus, such as a touchscreen, a display, or a keyboard, is mainly configured to: receive data input by a user, and output data to the user.

After the terminal device is powered on, the processor may read the software program in the storage unit, explain and execute instructions of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives a radio frequency signal through the antenna, converts the radio frequency signal into a baseband signal, and outputs the baseband signal to the processor; and the processor converts the baseband signal into data, and processes the data.

A person skilled in the art may understand that for ease of description, FIG. 11 shows only one memory and only one processor. An actual terminal device may have a plurality of processors and a plurality of memories. The memory may also be referred to as a storage medium, a storage device, or the like. This is not limited in the embodiments of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 11 is integrated with functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program, so that the processor executes the software program to implement a baseband processing function.

For example, in this embodiment of this application, the antenna and the control circuit that have receiving and sending functions may be considered as a transceiver unit 810 of the terminal device 800, and the processor having a processing function may be considered as a processing unit 820 of the terminal device 800. As shown in FIG. 11, the terminal device 800 includes a transceiver unit 810 and a processing unit 820. The transceiver unit may also be referred to as a transceiver, a transceiver machine, a transceiver apparatus, or the like. Optionally, a component that is in the transceiver unit 810 and that is configured to implement a receiving function may be considered as a receiving unit, and a component that is in the transceiver unit 810 and that is configured to implement a sending function may be considered as a sending unit. In other words, the transceiver unit includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

Figure 12:
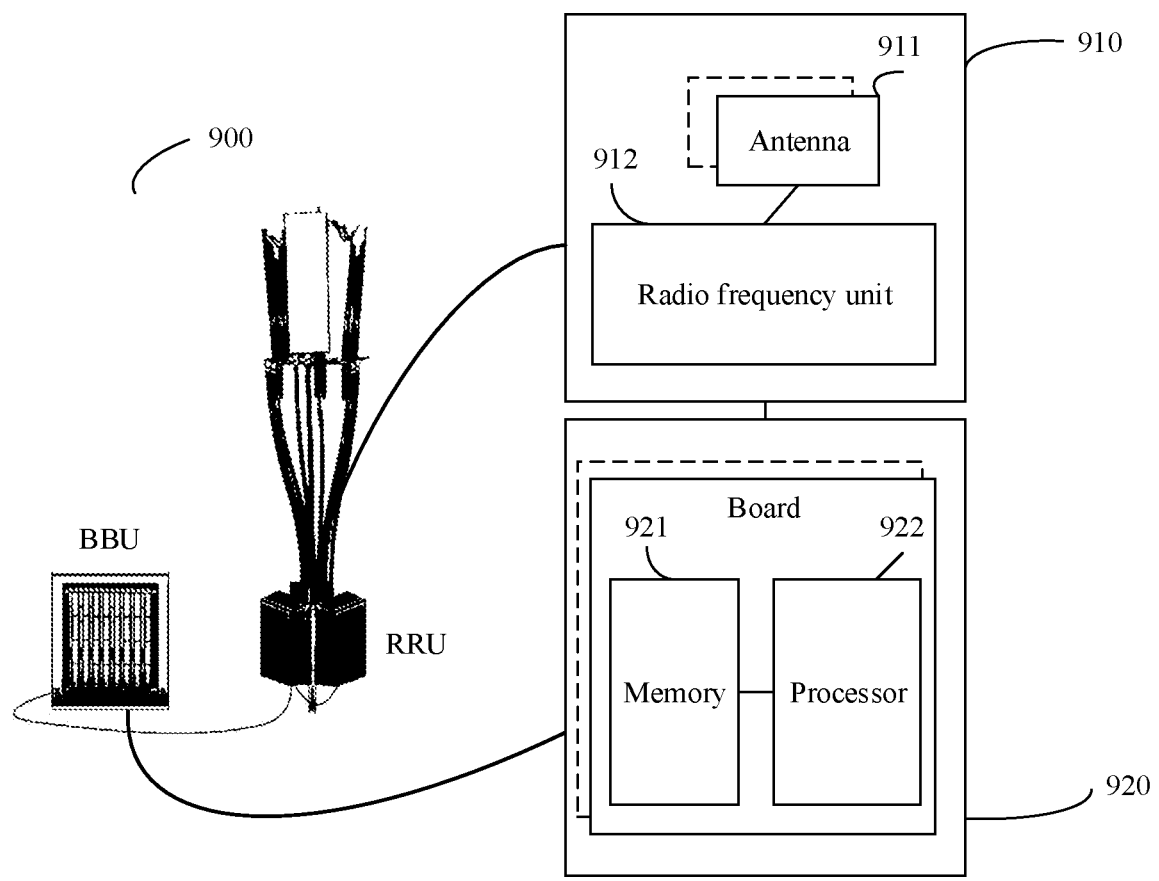
FIG. 12 is a schematic structural diagram of an example of an access device according to this application.

FIG. 12 is a schematic structural diagram of an access device 900 according to an embodiment of this application. The access device 900 may be configured to implement a function of the access device in the foregoing method (for example, the access device #A, the access device #B, the access device #1, the access device #2, the access device #x, the access device #y, the access device #z, or the access device #w). The access device 900 includes one or more radio frequency units such as a remote radio unit (RRU) 910 and one or more baseband units (BBU) (which may also be referred to as a digital unit, digital unit, DU) 920. The RRU 910 may be referred to as a transceiver unit, a transceiver machine, a transceiver circuit, a transceiver, or the like, and may include at least one antenna 911 and a radio frequency unit 912. The RRU 910 is mainly configured to: send and receive a radio frequency signal and perform conversion between a radio frequency signal and a baseband signal, for example, is configured to send the signaling message described in the foregoing embodiment to a terminal device. The BBU 920 is mainly configured to: perform baseband processing, control a base station, and the like. The RRU 910 and the BBU 920 may be physically disposed together, or may be physically separated, that is, in a distributed base station.

The BBU 920 is a control center of the base station, and is also referred to as a processing unit, mainly configured to implement a baseband processing function such as channel encoding, multiplexing, modulation, or spreading. For example, the BBU (the processing unit) 920 may be configured to control a base station 40 to perform the operation procedure related to the network device in the foregoing method embodiments.

In an example, the BBU 920 may include one or more boards, and a plurality of boards may jointly support a radio access network (such as an LTE system or a 5G system) of a single access standard, or may separately support radio access networks of different access standards. The BBU 920 further includes a memory 921 and a processor 922. The memory 921 is configured to store necessary instructions and data. For example, the memory 921 stores the codebook and the like in the foregoing embodiments. The processor 922 is configured to control the base station to perform necessary actions. For example, the processor 922 is configured to control the base station to perform an operation procedure related to the network device in the foregoing method embodiments. The memory 921 and the processor 922 may serve one or more boards. In other words, a memory and a processor may be independently disposed on each board. Alternatively, a plurality of boards may share a same memory and a same processor. In addition, a necessary circuit may further be disposed on each board.

In a possible implementation, with development of a system-on-chip (SoC) technology, all or some functions of the parts 920 and 910 may be implemented by using the SoC technology, for example, implemented by using one base station function chip. The base station function chip integrates components such as a processor, a memory, and an antenna port. A program of a base station-related function is stored in the memory, and the processor executes the program to implement the base station-related function. Optionally, the base station function chip can also read a memory outside the chip to implement the base station-related function.

It should be understood that the structure of the network device shown in FIG. 12 is merely a possible form, but should not constitute any limitation on the embodiments of this application. In this application, there may be a base station structure in another form in the future.

According to the methods provided in the embodiments of this application, an embodiment of this application further provides a communication system, including the foregoing access device and one or more terminal devices.

It should be understood that, the processor in the embodiments of this application may be a central processing unit (CPU), or may further be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any other combination thereof. When software is used to implement the embodiments, all or some of the foregoing embodiments may be implemented in a form of a computer program product. The computer program product includes one or more computer instructions or computer programs. When the computer instructions or the computer programs are loaded or executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "I" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. A person skilled in the art may clearly understand that, for the purpose of convenient and brief description, for detailed working processes of the foregoing system, apparatus, and unit, refer to corresponding processes in the foregoing method embodiments. Details are not described herein again. In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions in the embodiments. In addition, functional units in the embodiments of this application may be integrated into one processing unit, or each of the units may exist alone physically, or two or more units are integrated into one unit. When the functions are implemented in the form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, for example a USB flash drive, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method performed by a first access device or by a terminal device, comprising:
   determining reference information that comprises information about a first duration, information about a first cell, and information indicating a radio access network based notification area update (RNAU) type, wherein the RNAU type is a type of an RNAU performed by the terminal device in the first cell, the RNAU type comprises a periodically triggered RNAU type or a terminal device movement triggered RNAU type, and the first duration comprises duration in which the terminal device is in an inactive state; and
   sending the reference information to a second access device.

2. The method according to claim 1, wherein the reference information further comprises information about a second cell, the second cell is a cell in which the terminal device, in the inactive state corresponding to the first duration, is located.

3. The method according to claim 1, wherein the reference information further comprises information about an inactive state type corresponding to the first duration, and the inactive state type comprises a session inactive state type, a data radio bearer inactive state type, or a terminal device inactive state type.

4. The method according to claim 1, wherein the method further comprises:
   recording the reference information in history information of the terminal device.

5. The method according to claim 1, wherein the method further comprises:
   receiving request information; and
   the sending the reference information comprises sending the reference information based on the request information.

6. The method according to claim 5, wherein the request information comprises type indication information, the type indication information is used to indicate a first inactive state type, and the first inactive state type comprises the session inactive state type, the data radio bearer inactive state type, or the terminal device inactive state type; and
   the determining reference information comprises:
   determining the information about the first duration based on the type indication information, so that the inactive state type corresponding to the first duration is the first inactive state type.

7. The method according to claim 1, wherein when the method is performed by the first access device, the method further comprises:
   receiving first indication information sent by a third access device, wherein the first indication information is used to indicate the first duration; or
   receiving second indication information sent by a third access device, wherein the second indication information is used to indicate a moment at which the terminal device enters the inactive state and a moment at which the terminal device ends the inactive state, wherein
   the first access device comprises a centralized unit (CU), and the third access device comprises a distributed unit DU; or
   the first access device comprises a centralized unit control plane (CU-CP) entity, and the third access device comprises a centralized unit user plane (CU-UP) entity, wherein
   at least one protocol layer of a packet data convergence protocol (PDCP) layer or a radio resource control (RRC) layer is configured in the CU; and
   at least one protocol layer of a radio link control (RLC) layer, a media access control (MAC) layer, or a physical (PHY) layer is configured in the DU.

8. A wireless communication method performed by a second access device, comprising:
   receiving reference information from a terminal device or a first access device communicating with the terminal device, wherein the reference information comprises information about a first duration, information about a first cell, and information indicating a radio access network based notification area update (RNAU) type, the RNAU type is a type of an RNAU performed by the terminal device in the first cell, the RNAU type comprises a periodically triggered RNAU type or a terminal device movement triggered RNAU type, and the first duration comprises duration in which the terminal device is in an inactive state; and
   configuring a radio access network based notification area (RNA) for the terminal device based on the reference information.

9. The method according to claim 8, wherein the reference information further comprises information about a second cell corresponding to the first duration, and the second cell comprises a cell in which the terminal device, in the inactive state corresponding to the first duration, is located.

10. The method according to claim 8, wherein the reference information further comprises information about an inactive state type corresponding to the first duration, and the inactive state type comprises a session inactive state type, a data radio bearer inactive state type, or a terminal device inactive state type; and
    the configuring the RNA for the terminal device comprises configuring, based on the first duration, the duration of the inactive state timer that is of the terminal device and that is in the inactive state type corresponding to the first duration.

11. The method according to claim 8, wherein the reference information is carried in history information of the terminal device.

12. The method according to claim 8, wherein the method further comprises:
    sending request information, wherein the request information is used to request the reference information.

13. The method according to claim 12, wherein the request information comprises type indication information, the type indication information is used to indicate a first inactive state type, and the first inactive state type comprises the session inactive state type, the data radio bearer inactive state type, or the terminal device inactive state type.

14. The method according to claim 8, wherein
    the first access device comprises a distributed unit (DU), and the second access device comprises a centralized unit (CU); or
    the first access device comprises a centralized unit user plane (CU-UP) entity, and the second access device comprises a CU-CP entity, wherein
    at least one protocol layer of a packet data convergence protocol (PDCP) layer or a radio resource control (RRC) layer is configured in the CU; and
    at least one protocol layer of a radio link control (RLC) layer, a media access control (MAC) layer, or a physical (PHY) layer is configured in the DU.

15. A wireless communication apparatus, wherein the wireless communication apparatus is a terminal device or a first access device communicating with the terminal device, and the wireless communication apparatus comprises:
- at least one processor and a memory coupled with the at least one processor and comprising instructions that, when executed by the at least one processor, cause the wireless communication apparatus to:
- determine reference information that comprises information about a first duration, information about a first cell, and information of radio access network based notification area update (RNAU) type, wherein the RNAU type is a type of an RNAU performed by the terminal device in the first cell, the RNAU type comprises a periodically triggered RNAU type or a terminal device movement triggered RNAU type, and the first duration comprises duration in which the terminal device is in an inactive state; and
- send the reference information to a second access device.

16. The apparatus according to claim 15, wherein the reference information further comprises information about a second cell, the second cell is a cell in which the terminal device, in the inactive state corresponding to the first duration, is located.

17. The apparatus according to claim 15, wherein the reference information further comprises information about an inactive state type corresponding to the first duration, and the inactive state type comprises a session inactive state type, a data radio bearer inactive state type, or a terminal device inactive state type.

18. The apparatus according to claim 15, wherein the wireless communication apparatus is a first access device or a chip system of the first access device; and the reference information is sent to a second access device such that the second access configures a radio access network based notification area (RNA) for the terminal device based on the reference information.

* * * * *